(12) United States Patent
Carr et al.

(10) Patent No.: US 7,246,006 B2
(45) Date of Patent: Jul. 17, 2007

(54) METHOD AND SYSTEMS FOR DETERMINING INTERNAL COMBUSTION ENGINE CYLINDER CONDITION

(75) Inventors: Bernard J. Carr, Santa Barbara, CA (US); Nathan Perry, Goleta, CA (US); Kevin J. Gehris, Santa Barbara, CA (US); Kent E. Antognini, Lompoc, CA (US)

(73) Assignee: Vetronix Corporation, Santa Barbara, CA (US)

( * ) Notice: Subject to any disclaimer, the term of this patent is extended or adjusted under 35 U.S.C. 154(b) by 224 days.

(21) Appl. No.: 10/979,752

(22) Filed: Nov. 2, 2004

(65) Prior Publication Data

US 2006/0095196 A1    May 4, 2006

(51) Int. Cl.
*G01M 15/04* (2006.01)
(52) U.S. Cl. .......................................... 701/114; 73/116
(58) Field of Classification Search ............ 123/198 F; 701/114; 73/116
See application file for complete search history.

(56) References Cited

U.S. PATENT DOCUMENTS

| | | | |
|---|---|---|---|
| 3,789,658 A | 2/1974 | Olsen | |
| 3,940,977 A | 3/1976 | Voross et al. | |
| 4,027,532 A | 6/1977 | Trussell et al. | |
| 4,291,382 A | 9/1981 | Full et al. | |
| 4,309,900 A | 1/1982 | Kreft et al. | |
| 4,373,186 A | 2/1983 | Marshall et al. | |
| D268,174 S | 3/1983 | Noe | |
| 4,417,467 A | 11/1983 | Higgs et al. | |
| 4,418,388 A | 11/1983 | Allgor et al. | |
| RE31,656 E | 9/1984 | Howes | |
| 4,502,324 A | 3/1985 | Marino et al. | |
| 4,694,408 A | 9/1987 | Zaleski | |
| 4,791,808 A | 12/1988 | Lackner et al. | |
| 4,831,560 A | 5/1989 | Zaleski | |

(Continued)

OTHER PUBLICATIONS

"Electronic Specialties Model AS3000 Diagnostic Engine Analyzer", www.esitest.com/cart/as3000.html, 3 pages (author unknown, date unknown).

(Continued)

*Primary Examiner*—Stephen K. Cronin
*Assistant Examiner*—Arnold Castro
(74) *Attorney, Agent, or Firm*—Merchant & Gould P.C.

(57) ABSTRACT

A method of evaluating a contribution of a cylinder to an engine includes measuring a first revolutions per minute of the engine during an enabled state; determining a dwell period of the cylinder; applying a direct current voltage signal into a negative terminal of an ignition coil of the engine during the dwell period to disable the cylinder and create a disabled state; and measuring a second revolutions per minute of the engine during the disabled state. A system for evaluating a contribution of a cylinder to an engine includes a first measure module, a determine module, an apply module, and a second measure module. The first measure module measures a first revolutions per minute of the engine during an enabled state. The determine module determines a dwell period of the cylinder. The apply module applies a direct current voltage signal into a negative terminal of an ignition coil of the engine during the dwell period to disable the cylinder and create a disabled state. The second measure module measures a second revolutions per minute of the engine during the disabled state.

22 Claims, 23 Drawing Sheets

U.S. PATENT DOCUMENTS

| | | |
|---|---|---|
| 4,839,811 A | 6/1989 | Kanegae et al. |
| 4,980,845 A | 12/1990 | Govekar |
| 5,034,893 A | 7/1991 | Fisher |
| 5,063,515 A | 11/1991 | Kunst et al. |
| 5,303,158 A | 4/1994 | Kuroda |
| 5,387,870 A | 2/1995 | Knapp et al. |
| 5,396,427 A | 3/1995 | Piehl et al. |
| 5,446,664 A | 8/1995 | Vossen et al. |
| 5,495,415 A | 2/1996 | Ribbens et al. |
| 5,616,834 A | 4/1997 | Lynch et al. |
| 5,680,311 A | 10/1997 | Trsar et al. |
| 6,002,980 A | 12/1999 | Taylor et al. |
| 6,131,444 A | 10/2000 | Wu et al. |
| 6,216,678 B1 | 4/2001 | James et al. |

OTHER PUBLICATIONS

"Sun Machine 450", www.snapondiag.com/snapon-sun-machine.asp, 2 pages (author unknown, date unknown).

SPX Corporation, "OTC Vision Premier", www.etoolcart.com/browseproducts/Engine-Analyzer-Vision-Premier—OTC44551.HTML, 8 pages (date unknown).

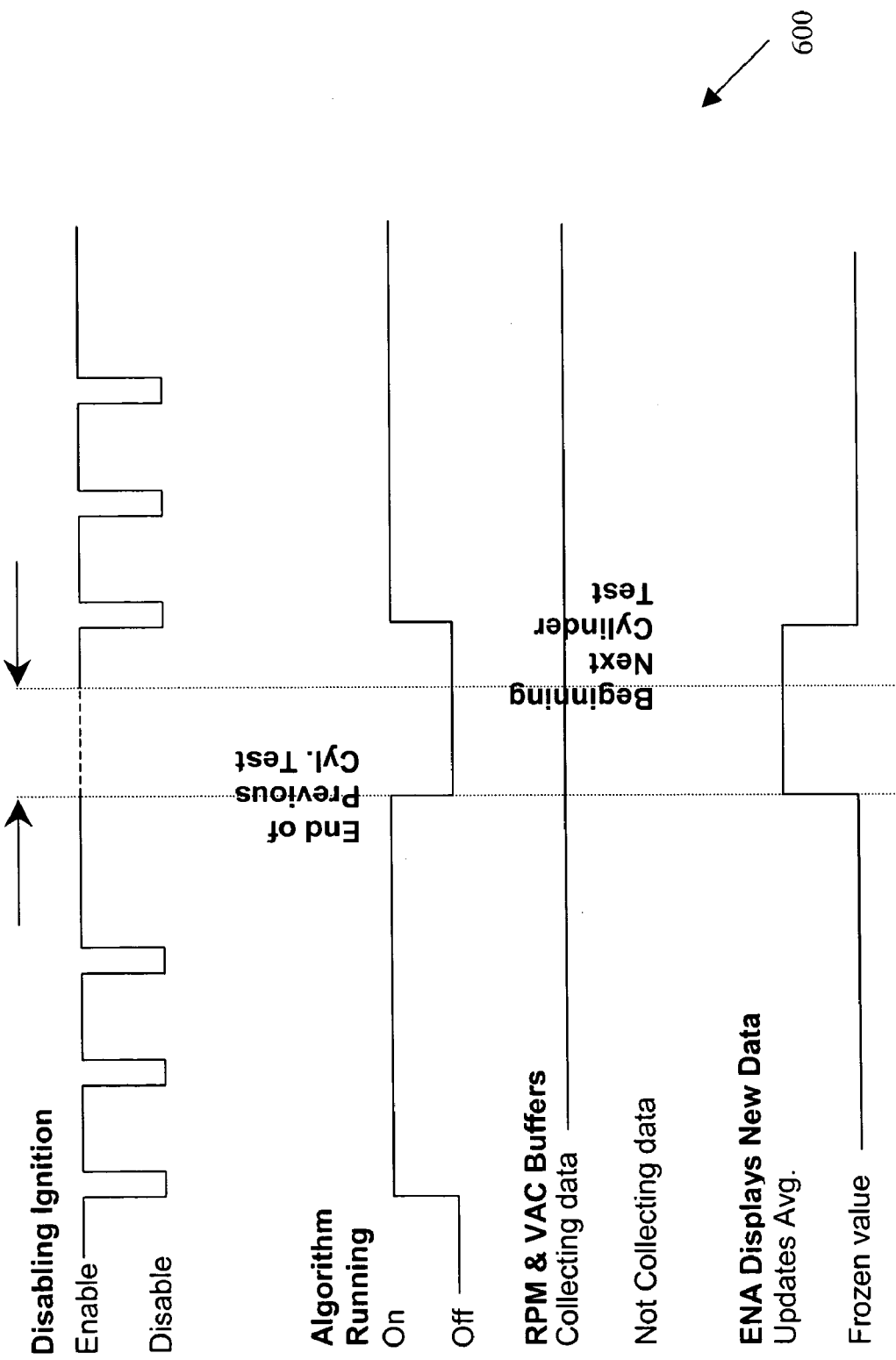

METHOD AND SYSTEMS FOR DETERMINING INTERNAL COMBUSTION ENGINE CYLINDER CONDITION

TECHNICAL FIELD

The present invention relates to engine diagnostics, and more particularly to methods for determining internal combustion engine cylinder conditions.

BACKGROUND

Internal combustion engines frequently misfire on one or more cylinders, requiring repair to that cylinder or cylinders. In order to diagnose such engines, one must determine which cylinder is encountering a problem. The diagnostics typically involve disabling a cylinder and then monitoring the resulting engine performance. Each cylinder is evaluated to determine which cylinder or cylinders is encountering a problem. In general, if a properly operating cylinder is disabled, the engine will run rougher. Conversely, if a non-properly operating cylinder is disabled, there will be little impact on the performance of the engine. By systematically disabling the cylinders of the engine one at a time, one can locate the defective cylinder.

A variety of techniques for disabling a cylinder are known, such as that described in U.S. Pat. No. 4,027,532 (the '532 patent). There are disadvantages to these prior systems. One such disadvantage is that they are difficult to connect to the engine. In today's engines, the component parts are less accessible and are often hidden under plastic cladding. So, attaching all the necessary leads to disable a cylinder is a daunting task. In FIG. 1 of the '532 patent, several different leads are required to perform the test. In today's engine, most of those engine components are inaccessible.

Therefore, improvements are desirable.

SUMMARY

In accordance with the present invention, the above and other problems are solved by the following:

In one aspect of the present invention, a method of evaluating a contribution of a cylinder to an engine is disclosed. The method includes measuring a first revolutions per minute of the engine during an enabled state; determining a dwell period of the cylinder; applying a direct current voltage signal into a negative terminal of an ignition coil of the engine during the dwell period to disable the cylinder and create a disabled state; and measuring a second revolutions per minute of the engine during the disabled state.

In another aspect of the present invention, a system for evaluating a contribution of a cylinder to an engine is disclosed. The system includes a first measure module, a determine module, an apply module, and a second measure module. The first measure module measures a first revolutions per minute of the engine during an enabled state. The determine module determines a dwell period of the cylinder. The apply module applies a direct current voltage signal into a negative terminal of an ignition coil of the engine during the dwell period to disable the cylinder and create a disabled state. The second measure module measures a second revolutions per minute of the engine during the disabled state.

In yet another aspect of the present invention, a computer program product readable by a computing system and encoding instructions for evaluating a contribution of a cylinder to an engine is disclosed. The computer process includes measuring a first revolutions per minute of the engine during an enabled state; determining a dwell period of the cylinder; applying a direct current voltage signal into a negative terminal of an ignition coil of the engine during the dwell period to disable the cylinder and create a disabled state; and measuring a second revolutions per minute of the engine during the disabled state.

In yet another aspect of the present invention, a system for diagnosing an internal combustion engine is disclosed. The system includes a computing system, a clamping circuit, and a plurality of devices. The computing system executes an algorithm for evaluating a contribution of a cylinder in the internal combustion engine. The clamping circuit applies a direct current voltage to a negative terminal of an ignition coil in the internal combustion engine. The plurality of devices connect the computing system and the clamping circuit to the internal combustion engine.

In yet another aspect of the present invention, a graphical user interface used in conjunction with a diagnostic system for diagnosing an internal combustion engine having a plurality of cylinders is disclosed. The graphical user interface includes a first field, a second field, a third field, a graphical representation, and a fourth field. The first field displays the internal combustion engine's revolutions per minute with all cylinders firing. The second field displays the internal combustion engine's revolutions per minutes with a cylinder disabled. The third field displays the difference between the first field and the third field. The graphical representation represent the plurality of cylinders and includes the cylinder number and a bar graph representing the third field. The fourth field displays the internal combustion engine's revolutions per minute at any one time.

The invention may be implemented as a computer process; a computing system, which may be distributed; or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its scope may be obtained from the accompanying drawings, which are briefly described below, from the following detailed descriptions of presently preferred embodiments of the invention and from the appended claims.

BRIEF DESCRIPTION OF THE DRAWINGS

Referring now to the drawings in which like reference numbers represent corresponding parts throughout:

FIG. 6 illustrates an automated balance ignition disabling and data collection timing, according to an example embodiment of the present disclosure;

DETAILED DESCRIPTION

Figure 1:
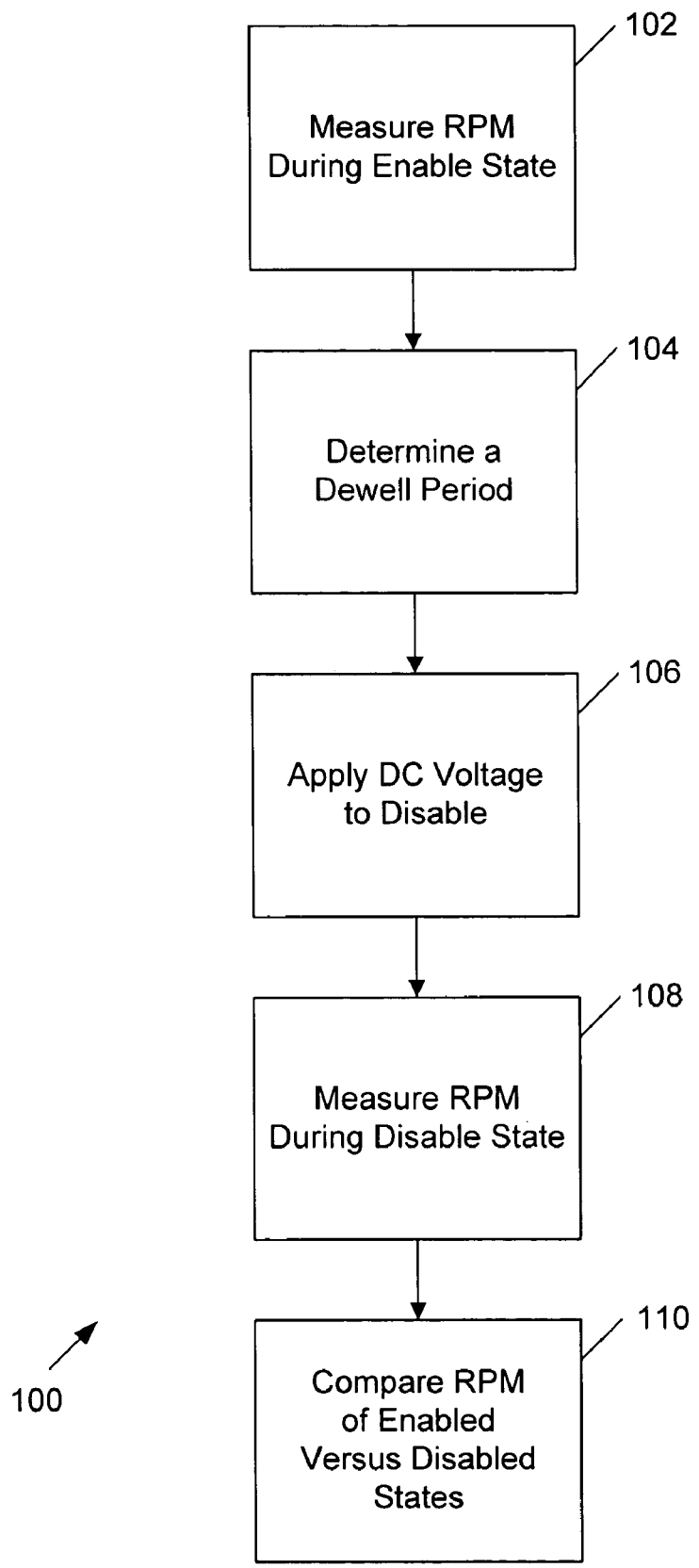
FIG. 1 is a schematic representation of methods and systems for engine diagnostics, according to an exemplary embodiment of the present disclosure.

In the following description of preferred embodiments of the present invention, reference is made to the accompanying drawings that form a part hereof, and in which is shown by way of illustration specific embodiments in which the invention may be practiced. It is understood that other embodiments may be utilized and changes may be made without departing from the scope of the present invention.

In general, the present disclosure describes methods and systems for diagnosing internal combustion engine cylinder conditions. The diagnosing system uses enabled and disabled states and utilizes measured signals from the engine's ignition system. The diagnosing system disables the engine's ignition for the purpose of evaluating each cylinder's contribution to the overall engine RPM. Preferably, disabling the primary ignition is accomplished by injecting a voltage signal into the ignition coil's primary circuit during a specified dwell period. The disabling signal remains active through the duration of the typical ignition firing and burn period, thus preventing combustion from taking place. Each cylinder's contribution to the overall RPM is evaluated by assessing the change in engine RPM between the enabled period and the disabled period.

Based on the premise that if each cylinder contributes to the overall engine RPM, elimination of one or more cylinder's ignition firing will reduce the engine RPM proportional to the eliminated cylinder(s) contribution. The disabling process consists of interactive cycles of the enabled and disabled states to allow for the system to maintain an engine RPM and Sync cylinder reference. The disable-enable scheme can be used for evaluation of all cylinders to accurately compare engine RPM differences with the sync cylinder's differences. During a sync cylinder disabling period, the ignition firing event can be disabled for a predetermined number of cycles followed by another predetermined number of enabled ignition firing events.

There are two main approaches to the disabling schemes, the "Speed Decay" and the "Summation" method. The Speed Decay method evaluates the enabled state against a disabled period where ignition firing on the cylinders being evaluated is disabled for successive firing cycles for a long duration. The Summation method evaluates the selected cylinders for disabling on an intermittent firing and disabling scheme. Evaluation of the data may also be intermittent with each disabling period. The two methods may require different data inputs (i.e. primary and sync signals as an input for Speed Decay and sync only input for Summation method) for the system to maintain cylinder firing reference. The ignition signal that is being used for reference would also be the signal that does not appear during a disabling period for the faulted cylinder.

Another optional feature of the present disclosure would be acquiring, calculating, and displaying the DC vacuum difference between the enabled and disabled states. The DC vacuum would be measured at a central port in the intake manifold and the data would be captured at the same time the RPM difference data is captured. The difference in the DC vacuum data would be displayed. Of course, this option would not be available on a diesel engine.

There are a number of advantages to the methods and systems described herein. These advantages include, for example, determining where a potential engine fault might be; obtaining a visual "heartbeat" indication of the engine's health; determining the relative strength of each cylinder within the engine; monitoring vehicle conditions for problem repeatability and repair verification; and only connection to three underhood electrical circuits (ignition primary signal, secondary ignition coil wire signal, and secondary ignition signal of an individual cylinder signal).

Referring now to FIG. 1, an example schematic representation of a diagnosing system 100 is illustrated. A first measure operation 102 measures the engine RPM during an enabled state. Preferably, the enabled state is the state of the engine prior to diagnosing the engine. A determine operation 104 determines the dwell period for an individual cylinder. Preferably, the dwell period is the period of charging of the primary ignition coil. An apply operation 106 applies a voltage signal to disable the cylinder. Preferably, the voltage signal is a direct current voltage signal and is applied to the negative terminal of an ignition coil of the cylinder during the dwell period to disable the cylinder and create a disabled state. A second measure operation 108 measures the engine RPM during the disabled state. A compare operation 110 compares the RPM of the engine during the enabled state to the RPM of the engine during the disabled state to determine the contribution of the cylinder to the engine.

Figure 2:
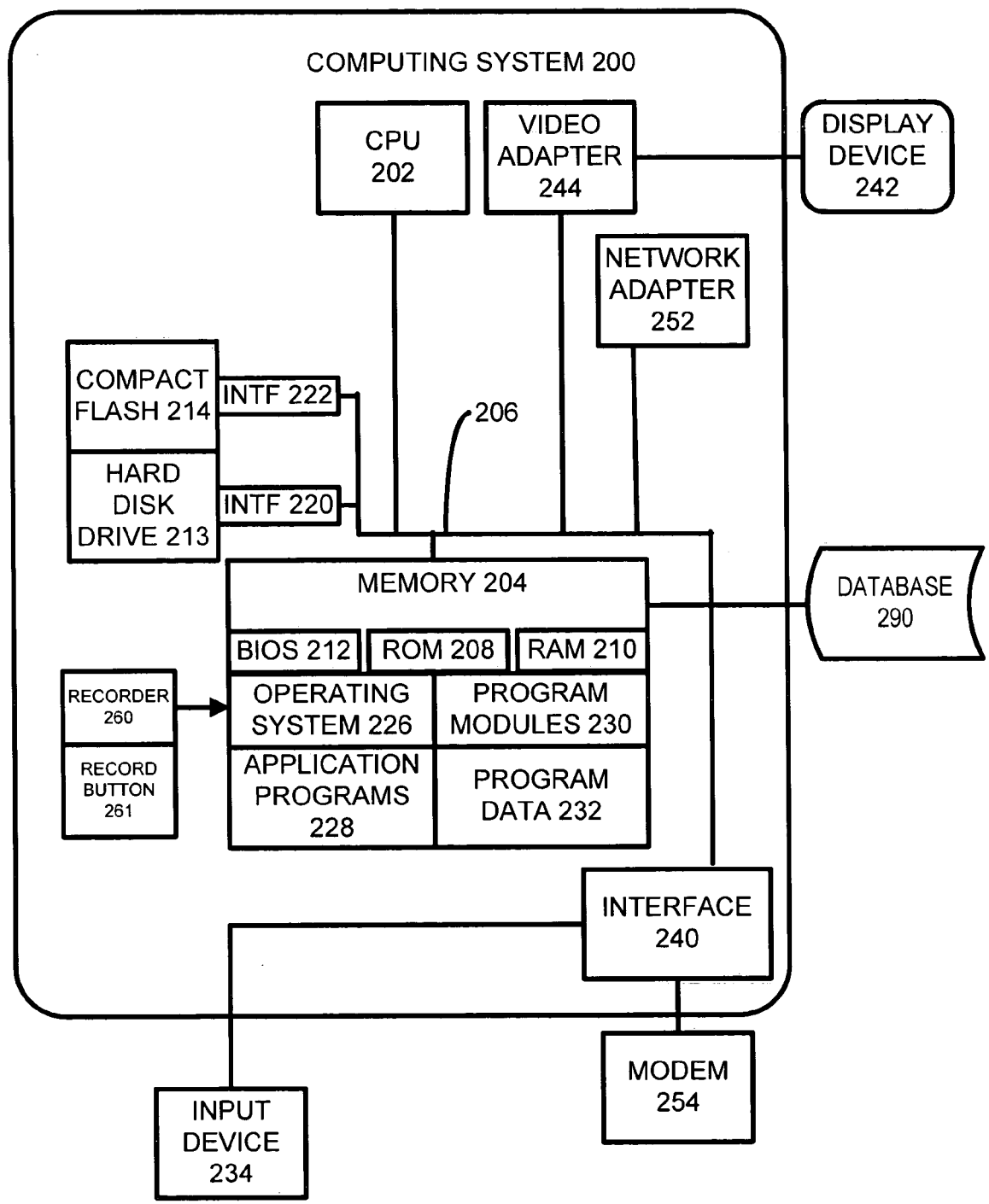
FIG. 2 is a schematic representation of a computing system that may be used to implement aspects of the present disclosure.

FIG. 2 and the following discussion are intended to provide a brief, general description of a suitable computing environment in which the present invention might be implemented. Although not required, the present invention can be described in the general context of computer-executable instructions, such as program modules, being executed by a computing system. Generally, program modules include routines, programs, objects, components, data structures, etc. that perform particular tasks or implement particular abstract data types.

Those skilled in the art will appreciate that the present invention might be practiced with other computer system configurations, including handheld devices, palm devices, multiprocessor systems, microprocessor-based or programmable consumer electronics, network personal computers, minicomputers, mainframe computers, and the like. The present invention might also be practiced in distributed computing environments where tasks are performed by remote processing devices that are linked through a communications network. In a distributed computing environment, program modules might be located in both local and remote memory storage devices.

Referring now to FIG. 2, an exemplary environment for implementing embodiments of the present invention includes a general purpose computing device in the form of a computing system 200, including at least one processing system 202. A variety of processing units are available from a variety of manufacturers, for example, Intel, Advanced Micro Devices, or Motorola. The computing system 200 also includes a system memory 204, and a system bus 206 that couples various system components including the system memory 204 to the processing unit 202. The system bus 206 might be any of several types of bus structures including a memory bus, or memory controller; a peripheral bus; and a local bus using any of a variety of bus architectures.

Preferably, the system memory 204 includes read only memory (ROM) 208 and random access memory (RAM) 210. A basic input/output system 212 (BIOS), containing the basic routines that help transfer information between elements within the computing system 200, such as during start-up, is typically stored in the ROM 208.

Preferably, the computing system 200 further includes a secondary storage device 213, such as a hard disk drive, for reading from and writing to a hard disk (not shown), and/or a compact flash card 214.

The hard disk drive 213 and compact flash card 214 are connected to the system bus 206 by a hard disk drive interface 220 and a compact flash card interface 222, respectively. The drives and cards and their associated computer-readable media provide nonvolatile storage of computer readable instructions, data structures, program modules and other data for the computing system 200.

Although the exemplary environment described herein employs a hard disk drive 213 and a compact flash card 214, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 213, compact flash card 214, ROM 208, or RAM 210, including an operating system 226, one or more application programs 228, other program modules 230, and program data 232. A user may enter commands and information into the computing system 200 through an input device 234. Examples of input devices might include a keyboard, mouse, microphone, joystick, game pad, satellite dish, scanner, digital camera, touch screen, and a telephone. These and other input devices are often connected to the processing unit 202 through an interface 240 that is coupled to the system bus 206. These input devices also might be connected by any number of interfaces, such as a parallel port, serial port, game port, or a universal serial bus (USB). A display device 242, such as a monitor or touch screen LCD panel, is also connected to the system bus 206 via an interface, such as a video adapter 244. The display device 242 might be internal or external. In addition to the display device 242, computing systems, in general, typically include other peripheral devices (not shown), such as speakers, printers, and palm devices.

When used in a LAN networking environment, the computing system 200 is connected to the local network through a network interface or adapter 252. When used in a WAN networking environment, such as the Internet, the computing system 200 typically includes a modem 254 or other means, such as a direct connection, for establishing communications over the wide area network. The modem 254, which can be internal or external, is connected to the system bus 206 via the interface 240. In a networked environment, program modules depicted relative to the computing system 200, or portions thereof, may be stored in a remote memory storage device. It will be appreciated that the network connections shown are exemplary and other means of establishing a communications link between the computing systems may be used.

The computing system 200 might also include a recorder 260 connected to the memory 204. The recorder 260 includes a microphone for receiving sound input and is in communication with the memory 204 for buffering and storing the sound input. Preferably, the recorder 260 also includes a record key 261 for activating the microphone and communicating the sound input to the memory 204.

A computing device, such as computing system 200, typically includes at least some form of computer-readable media. Computer readable media can be any available media that can be accessed by the computing system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 200.

Computer readable media may also be referred to as computer program product.

Figure 3:
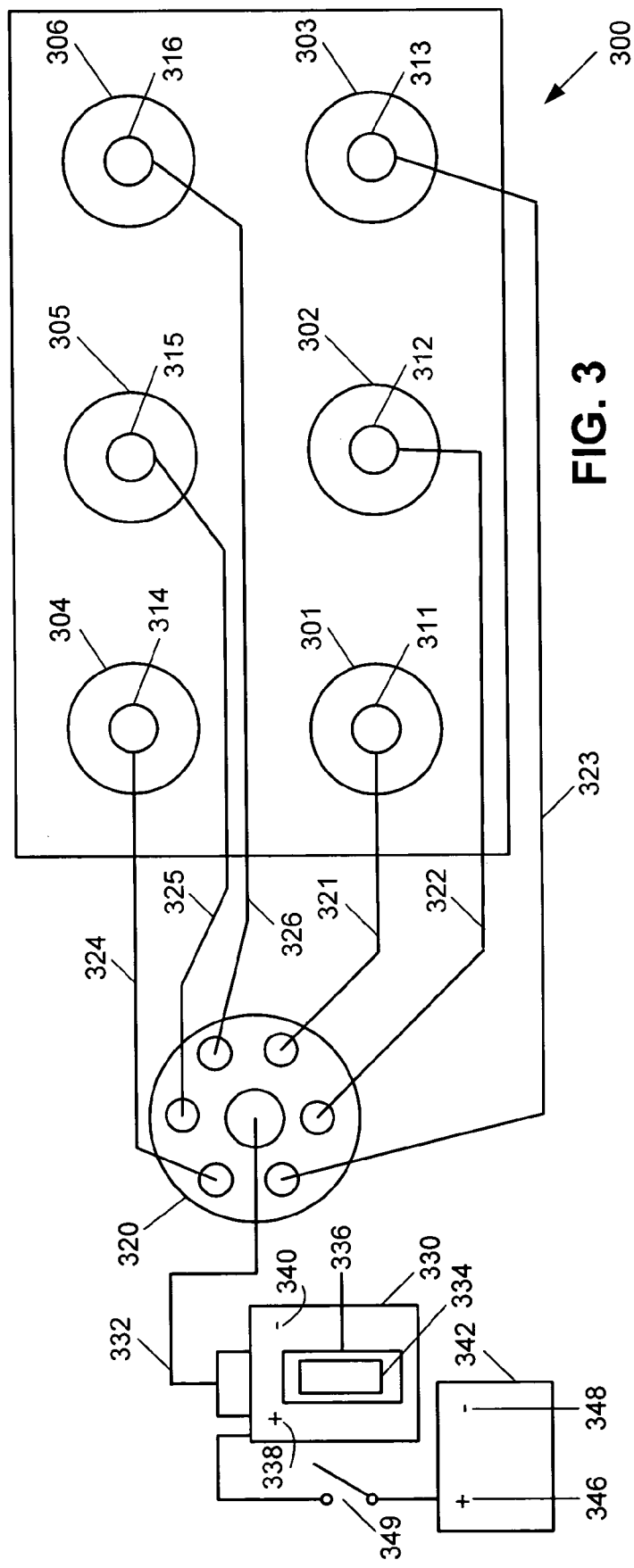
FIG. 3 is a block diagram of an internal combustion engine; according to an exemplary embodiment of the present disclosure.

FIG. 3 is a block diagram of a typical internal combustion engine 300. The engine 300 includes a first cylinder 301 having a first spark plug 311, a second cylinder 302 having a second spark plug 312, a third cylinder 303 having a third spark plug 313, a fourth cylinder 304 having a fourth spark plug 314, a fifth cylinder 305 having a fifth spark plug 315, and a sixth cylinder 306 having a sixth spark plug 316. Of course, many varieties of engines exist. The most prominent forms are four, six, eight, and twelve cylinder engines.

The engine 300 also includes a distributor 320. A first link 321, or spark plug wire, links the distributor 320 to the first spark plug 311. A second link 322 links the distributor 320 to the second spark plug 312. A third link 323 links the distributor 320 to the third spark plug 313. A fourth link 324 links the distributor to the fourth spark plug 314. A fifth link 325 links the distributor to the fifth spark plug 315. A sixth link 326 links the distributor to the sixth spark plug 316.

During operation of the engine 300, the first cylinder 301 fills with air and fuel. The first spark plug 311 forces electricity to arc across an air gap in the first spark plug 311. This electricity, or spark, across the air gap ignites the fuel and air mixture, which forces a piston to move. In order for the electricity to travel across the air gap of the spark plug, the electricity must be at a very high voltage. Preferably, the voltage is between 10,000 and 100,000 volts. Typically, the voltage is not greater than 50,000 volts.

The distributor 320 is also linked to an ignition coil 330 via a coil wire 332. The coil wire 332 is an insulated, high-voltage wire. The ignition coil 330 is a device that generates the high voltages required to create the arcing of electricity across the air gap in the spark plug, for example the first spark plug 311. The ignition coil 330 is essentially a high-voltage transformer made up of a first coil of wire 334, typically called a primary coil, and a second coil of wire 336, typically called a secondary coil. The second coil 336 is wrapped around the first coil 334. The second coil 336 typically has hundreds of times more turns of wire than the first coil 334. The ignition coil 330 also includes a positive terminal 338 and a negative terminal 340.

The ignition coil 330 is linked to a battery 342 through a switch 349, i.e. an ignition switch. Typically, the battery 342 is a 12-volt battery having a positive terminal 346 and a negative terminal 348. Current flows from the battery 342 through the first coil 334 when the ignition switch 349 is in the "on", or closed, position. The first coil 334 will have a magnetic field associated with it. When this circuit is suddenly broken, by breaker points (or by a solid-state device in an electronic ignition) the magnetic field of the first coil 334 collapses rapidly. The second coil 336 of the ignition coil 330 is engulfed by a powerful magnetic field. This field induces a current in the second coil 336 with a very high voltage of up to 50,000 volts because of the number of coils in the secondary winding of the second coil 336. The second coil 336 feeds this voltage to the distributor 320 via coil wire 332.

The distributor 320 distributes this high voltage to the spark plugs 311–316 of the cylinders 301–306, respectively, via links 321–326, respectively, in a firing order. Typically, the distributor 320 rotates in a clockwise rotation through the firing order. The firing order is the order in which the cylinders 301–306 fire or ignite the fuel and air mixture within them. This firing order is specific to each type of engine. In the example embodiment illustrated and discussed herein, the cylinders 301–306 fire in order with the first cylinder 301 being first, then the second cylinder 302, and so on until the sixth cylinder 306 fires. During the operation of the engine 300, this firing sequence repeats itself numerous times.

The combustion process of an internal combustion engine is known to one skilled in art. In general, the battery 342 provides power to the ignition coil 330 when the ignition switch 349 is thrown. The ignition coil 330 provides a very high, charged voltage to the distributor 320. The distributor 320 creates re-occurring ignition signals (one ignition signal for each spark plug 311–316 of the engine 300) and causes a cylinder 301–306 to fire by applying a high voltage to the spark plug 311–316 of that cylinder 301–306. The spark plug 311–316 supplies a spark that ignites the air and fuel mixture in the cylinder 301–306 so that combustion can occur, thus creating power, or work.

Unfortunately, it is not uncommon to have a cylinder 301–306 not fire correctly. This is commonly referred to as a misfire. If a cylinder 301–306 does not fire correctly, then the engine 300 loses power and will run roughly. Because each of the cylinders 301–306 contribute some power through combustion of the fuel and air in that cylinder 301–306 to the overall power of the engine, if a cylinder 301–306 misfires, there will be a drop in power in the engine 300. Cylinder 301–306 misfires can happen for a variety of reasons, for example, a bad spark plug, bad spark plug wire, a faulty distributor, including the rotor, cap, and primary circuits, a faulty coil, or the like. Diagnosing such misfires is an important diagnostic tool for mechanics or technicians of an internal combustion engine.

Figure 4:
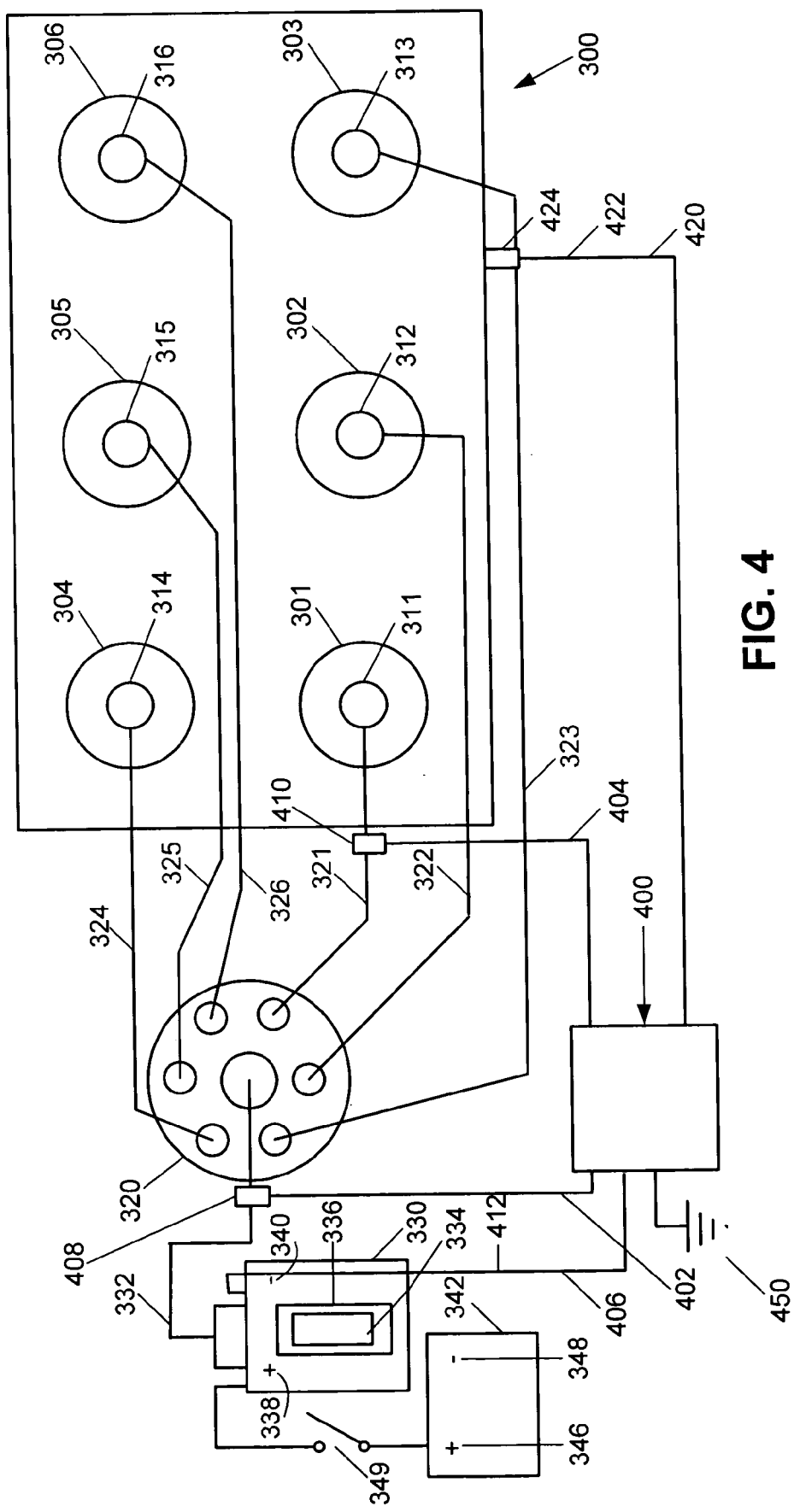
FIG. 4 is a block diagram of a diagnostic system connected to the internal combustion engine of FIG. 3, according to an exemplary embodiment of the present disclosure.

FIG. 4 is a block diagram of the internal combustion engine 300 of FIG. 3 with a diagnostic system 400 shown. The diagnostic system 400 is connected to the engine 300 to diagnose problems associated with the engine 300 as will be described in more detail below. Preferably, the diagnostic system 400 includes a first device 402, a second device 404, and a third device 406. Preferably, the first device 402 is a first probe 408. The first probe 408 can be a kv probe, or secondary ignition probe, of a known type. Preferably, the second device 404 is a second probe 410. The second probe 410 can be a sync probe of a known type. The third device 406 is a conductor 412.

The first probe 408 is connected to the coil wire 332. The second probe 410 can be connected to any of the links 321–326. Preferably, the second probe 410 is attached to the link 321–326 of the cylinder desired for triggering. This decision can be left up to the technician operating the diagnostic system 400. In the example illustrated, the second probe 410 is connected to the first link 321. The conductor 412 is connected to the negative terminal 340 of the ignition coil 330.

The diagnostic system 400 can also have a fourth device 420. Preferably, the fourth device 420 is a third probe 422. The third probe 422 can be a vacuum probe of a known type. The third probe 422 is connected to a vacuum port 424 Preferably, the diagnostic system 400 is also connected to a ground source 450, such as the vehicle's battery ground.

Once the diagnostic system 400 is connected to the engine 300, the engine 300 can be started and the overall engine RPM is measured. In this state, the engine 300 is operating as it was, prior to diagnosis, without any intervention from the diagnostic system 400. This is called the enable state.

The diagnostic system 400 can prevent any of the cylinders 301–306 from firing by preventing the high-voltage current necessary by the spark plug 311–316, respectively, from reaching the spark plug 311–316. The diagnostic system 400 prevents sparking by applying a clamping circuit to the ignition coil 330 via the conductor 412.

Figure 5A:
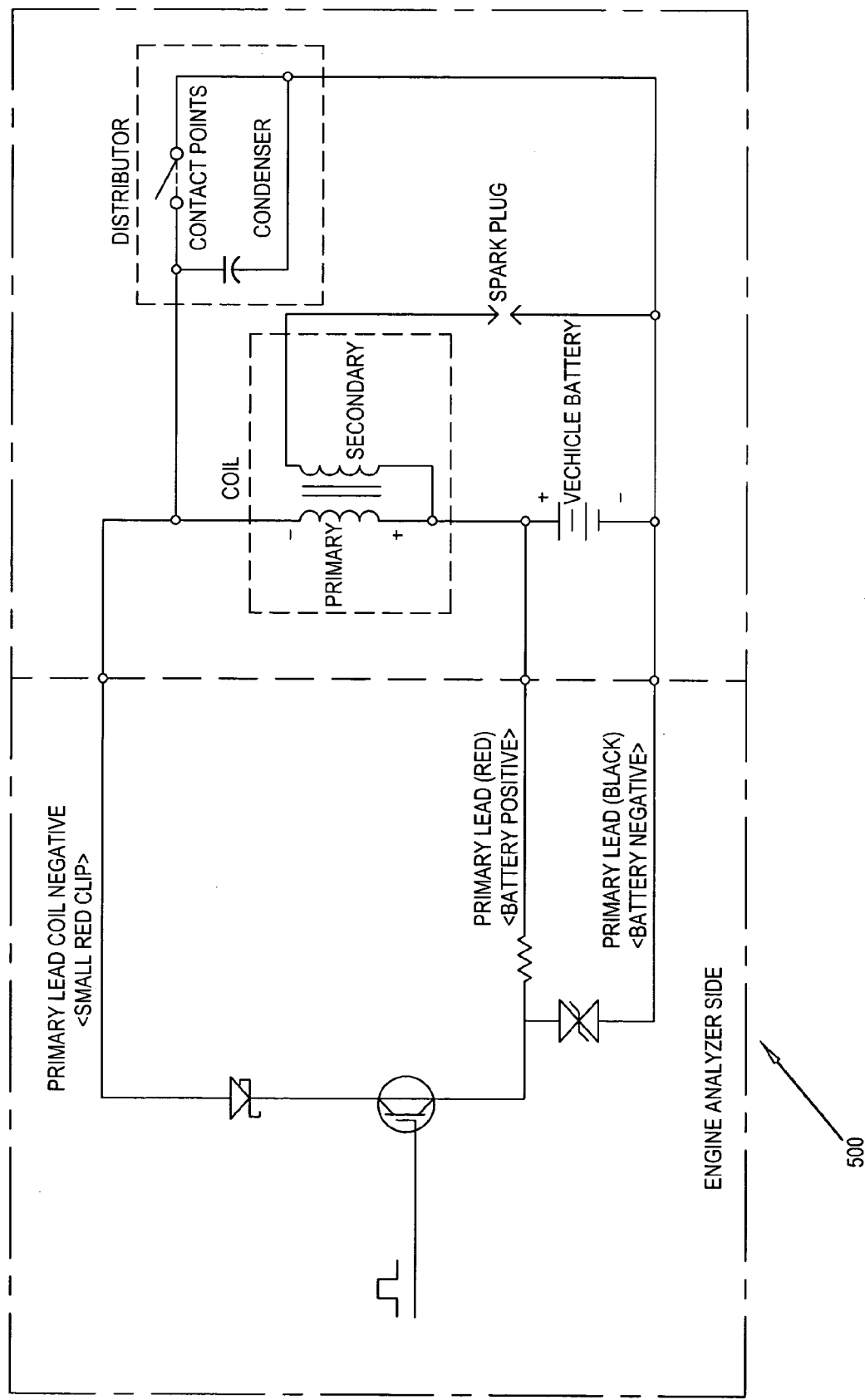
FIG. 5A is an electrical schematic of a clamping circuit, according to an exemplary embodiment of the present disclosure.

FIG. 5A is an electrical schematic of a clamping circuit 590, according to an example embodiment. The clamping circuit 590 can be used to prevent the current necessary by the spark plug from reaching the spark plug. Referring to FIGS. 4 and 5A, preferably, the clamping circuit involves applying a direct current voltage to the negative terminal 340 of the ignition coil 330. When the clamping circuit is applied to the ignition coil 330, the primary voltage does not exceed twelve volts. The clamping circuit prevents the first coil 334 from exceeding twelve volts when the selected cylinder 301–306 for disabling is charging the ignition coil during that cylinder's dwell period. The clamping circuit is maintained until the end of the coil oscillation period for the cylinder 301–306 being evaluated. When the ignition system's primary circuit is opened, the collapsing of the first coil's 334 weak voltage potential and low current flow will not be strong enough to induce a magnetic field across the second coil 336 that is capable of ionizing the air gap of the spark plug 311–316. The resulting effect is the disabling of the combustion process for the disabled cylinder 311–316.

By preventing any cylinder 301–306 from firing, the diagnostic system 400 creates a disabled state, i.e. one of the cylinders 301–306 has been disabled. Once disabled, the diagnostic system 400 can again measure the engine RPM in this disabled state. The diagnostic system 400 can repeat this disabled state for each cylinder 301–306 of the engine 300 and measure the engine RPM in each disabled state. The diagnostic system 400 can then compare the engine RPM in each disabled state to the engine RPM in the enabled state. This comparison for each cylinder 301–306 gives a relative contribution of each cylinder to the overall engine RPM. Thus, the diagnostic system 400 can determine which cylinder 301–306 or cylinders 301–306 is not firing correctly.

The act of disabling a cylinder 301–306 by the diagnostic system 400 can be repeated numerous times to achieve a better sampling of data regarding the cylinders 301–306. The diagnostic system 400 can disable a cylinder 301–306, measure the engine RPM, and then enable the cylinder 301–306 very rapidly by applying the clamping circuit to the ignition coil 330 for a very short period of time, usually less than twenty seconds.

This rapid cycle is an important advantage because it helps prevent damage to secondary engine components. The power train has specific components that can be damaged when a cylinder 301–306 is deactivated for an extended period of time. For example, not firing a cylinder 301–306 during operation increases oxygen content to the catalytic converter to internally react and heat up. Increasing oxygen to the catalytic converter causes the catalytic converter to heat up. Thus, shutting down a cylinder 301–306 for a length of time can overheat and destroy the catalytic converter. Careful attention to the potential damage of these components is important.

Figure 5B:
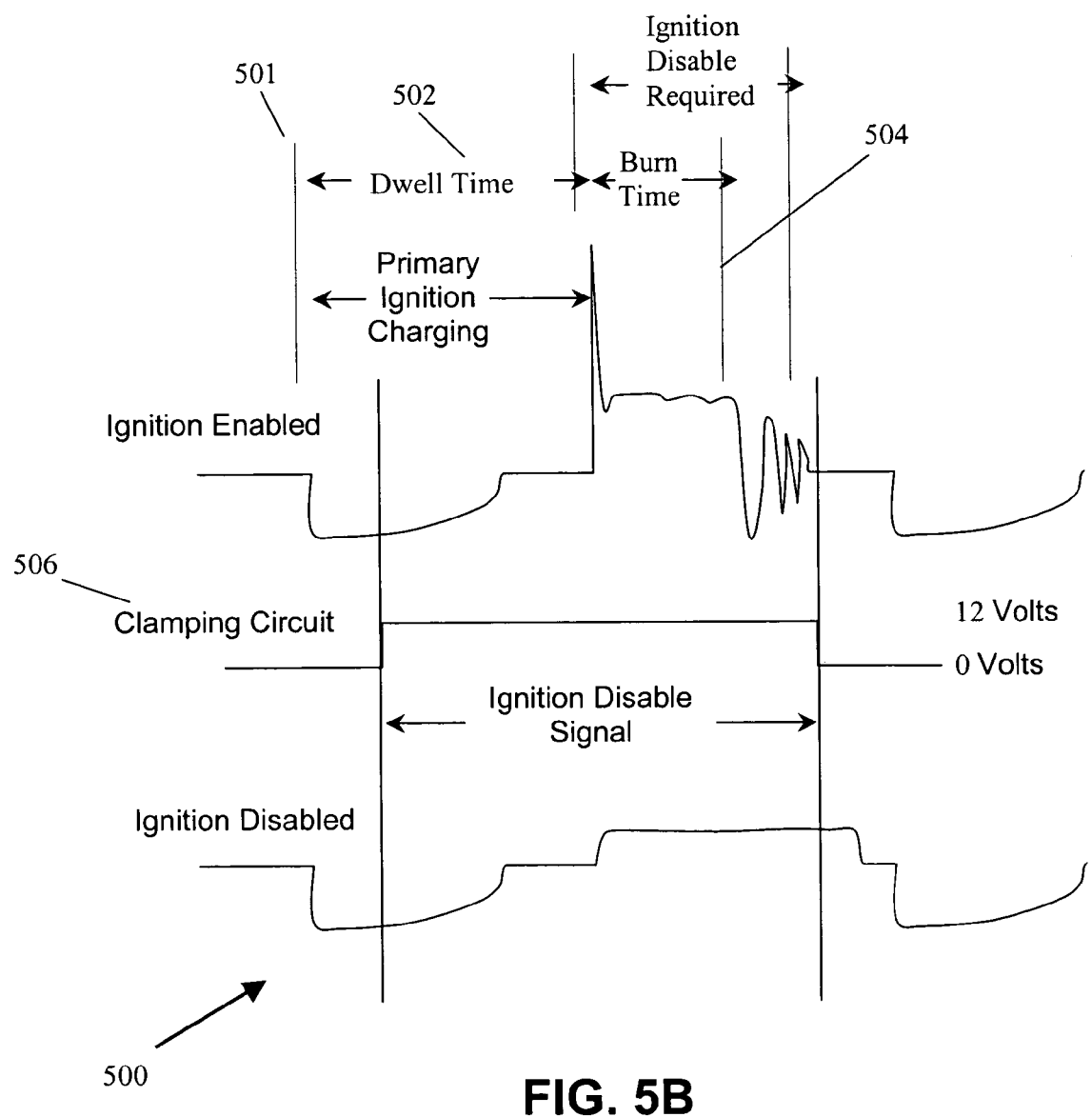
FIG. 5B is a schematic representation of a primary ignition waveform, according to an exemplary embodiment of the present disclosure.

There are at least two possible algorithms for disabling the firing of a cylinder. The first algorithm is the sync signal only algorithm. In this algorithm, the sync signal, i.e. the information from the first probe 408, is used to determine the required timing. Knowing the duration of time between the sync pulses and dividing it by the number of cylinders provides knowledge of each cylinder ignition firing point. Referring to FIG. 5B, breaking down the ignition waveform 500, the beginning 501 of the dwell period 502 and the end of the burn line 504 can be identified as occurring at a known percentage between the ignition pulses. Knowing the present engine RPM and using the sync pulse as a datum point, the cylinder for disabling can be identified by counting (t) periods out and subtracting the required percentage of (t) to find the beginning of the dwell period 501 for the cylinder to be disabled.

Disabling the sync cylinder would require counting (t) times the number of cylinders out from the datum point to the next sync less the percentage of the period to arrive at the point where the dwell period begins 501. This would be the point at which the diagnostic system 400 would apply the clamping circuit 506 to disable the sync cylinder. The diagnostic system 400 would not get the sync pulse for the disabled firing cycle period. The disabled cycles coupled with enabled cycles allows the diagnostic system 400 to maintain an engine RPM measurement.

The second algorithm shall enter the cylinder balance test using the sync signal to establish cylinder reference and engine RPM. Prior to disabling a cylinder and immediately following the last sync pulse capture, the diagnostic system 400 shall transition to using the primary signal as the input to maintain cylinder reference and engine RPM. The transition period will also require threshold voltage levels to be established for discrimination of a firing event from noise on the primary circuit. The diagnostic system 400 shall be required to switch from the sync signal to the primary signal and maintain cylinder reference at engine speeds up to 2000 RPM on a 12 cylinder engine. At the point when an ignition firing event has been detected by the sync probe, the diagnostic system 400 would transition from using the sync input to using the primary input for cylinder firing reference. A phased-lock loop control scheme shall be employed when using the primary signal input to track ignition firing events.

FIG. 6 illustrates an automated balance ignition disabling and data collection timing 600, according to an example embodiment of the present disclosure.

Figure 7:
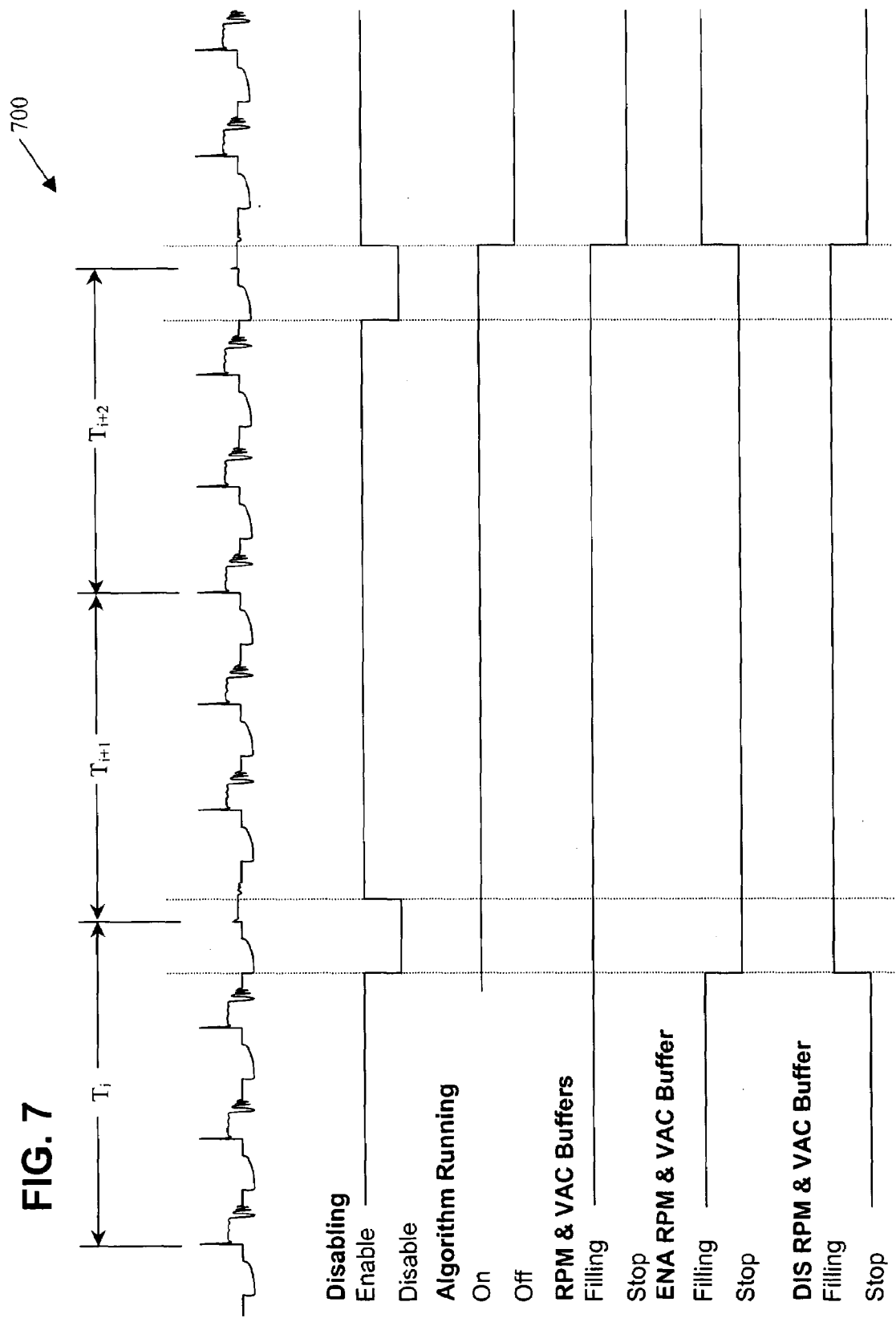
FIG. 7 illustrates a timing sequence for cylinder balance on a four cylinder engine with the sync probe disabled, according to an example embodiment of the present disclosure.

FIG. 7 illustrates a timing sequence 700 for cylinder balance on a four cylinder engine with the sync probe disabled, according to an example embodiment of the present disclosure.

Figure 8:
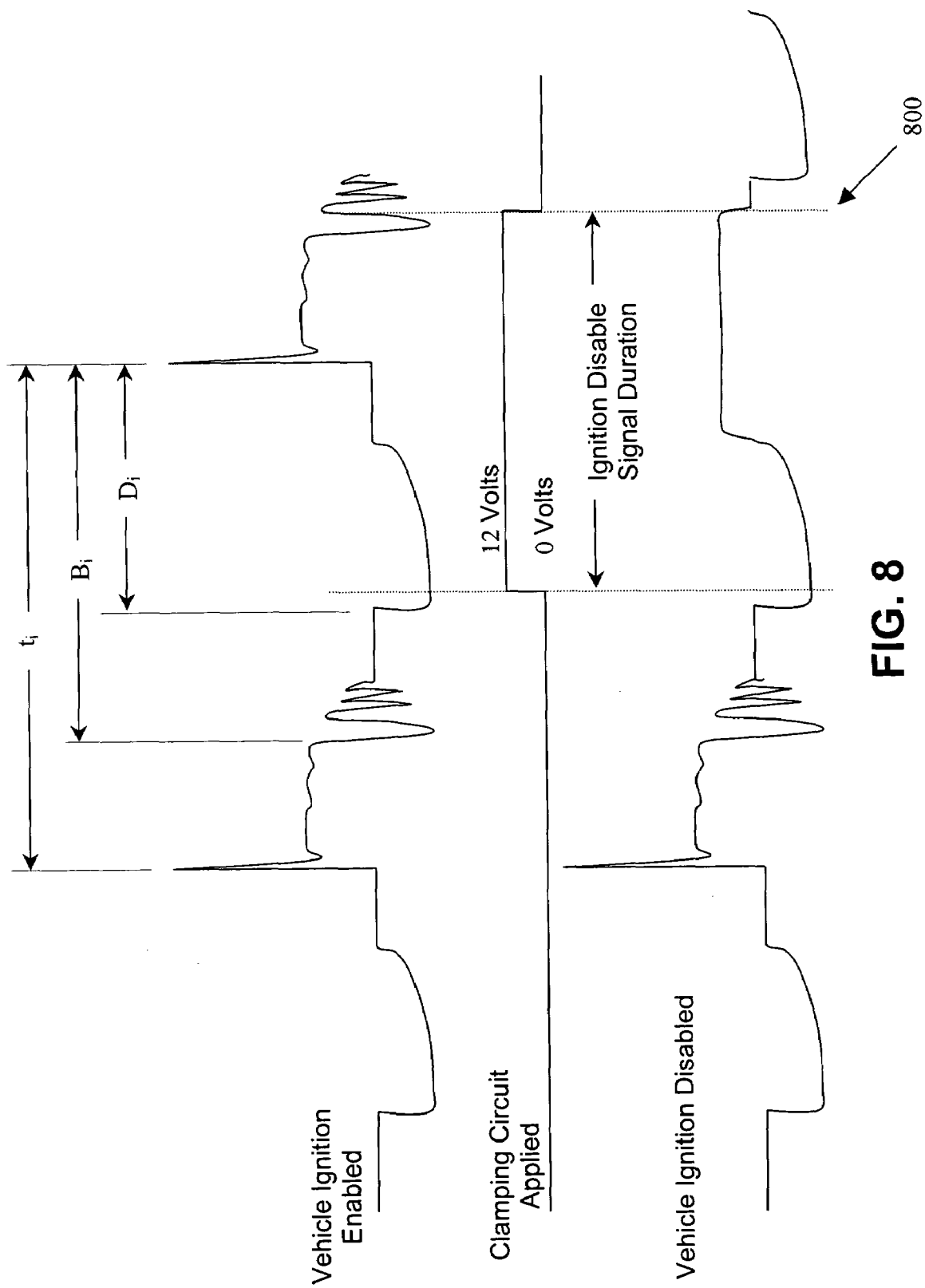
FIG. 8 illustrates waveform functions of the cylinder balance, according to an example embodiment of the present disclosure.

FIG. 8 illustrates waveform functions 800 of the cylinder balance, according to an example embodiment of the present disclosure.

Figure 9:
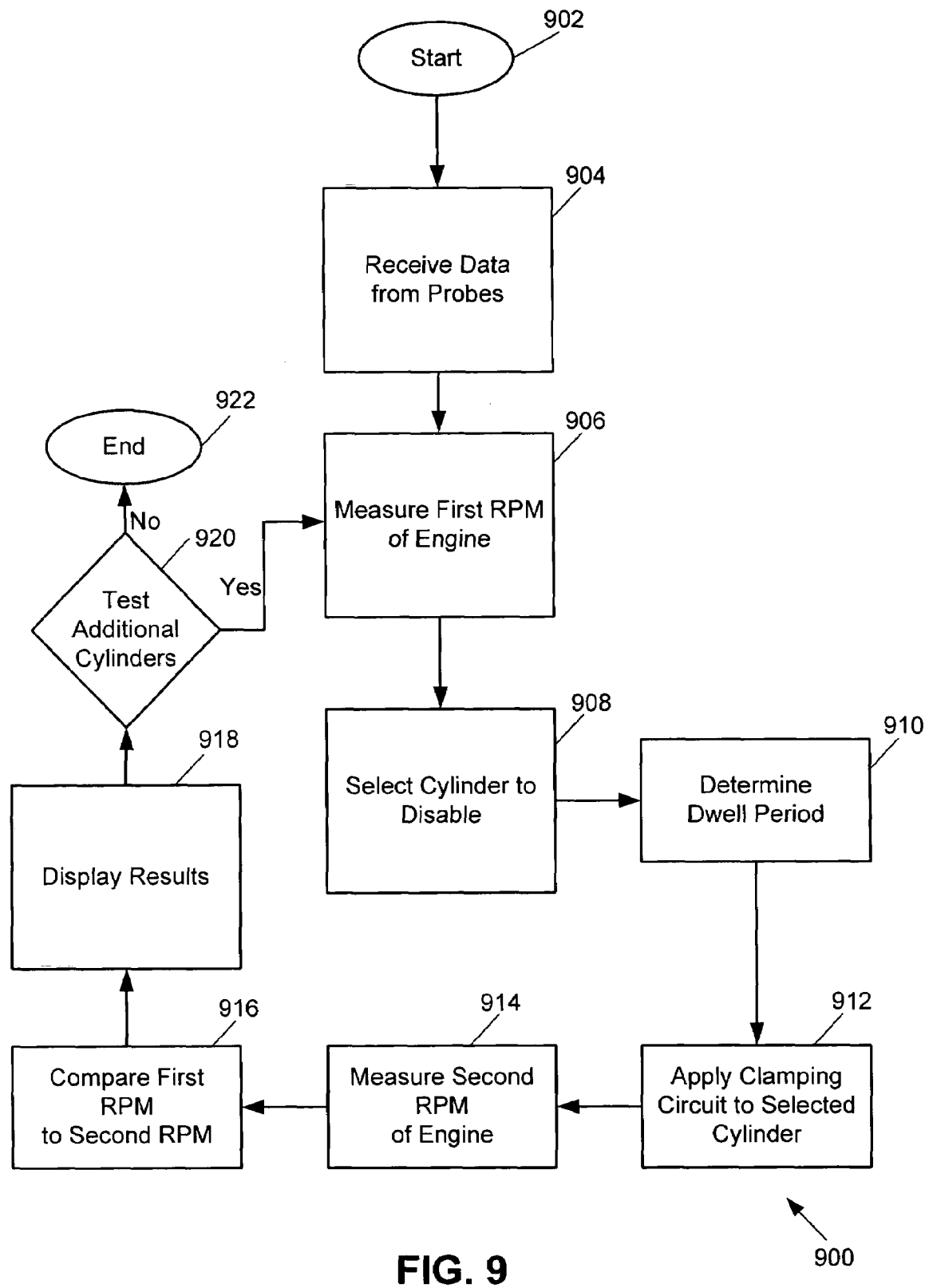
FIG. 9 illustrates a logical process flow diagram of a diagnostic system, according to an example embodiment of the present invention.

FIG. 9 illustrates an operational flow of a diagnostic system 900, according to an example embodiment of the present disclosure. Operational flow begins at a start point 902. A data operation 904 receives, or acquires, data from probes, for example, the first probe 408 and the second probe 410 of FIG. 4. A first measure operation 906 measures a first RPM of the engine, for example, the engine 300 of FIG. 3, during the enabled state. A cylinder operation 908 selects a cylinder to disable, for example the first cylinder 301 of FIG. 3. A dwell operation 910 determines the dwell period for the cylinder to be disabled. The dwell period is the time period of charging the primary coil, for example, the first coil 334 of FIG. 3.

A clamping operation 912 applies a clamping circuit to the selected cylinder to disable it and create a disabled state. The clamping circuit includes applying a direct current voltage to the negative terminal of the ignition coil, for example the negative terminal 340 of the ignition coil 330 of FIG. 3. The clamping circuit prevents the primary coil, for example the first coil 334 of FIG. 3, from exceeding twelve volts when the selected cylinder, for example the first cylinder 301 of FIG. 3, for disabling is charging the ignition coil during that cylinder's dwell period. The clamping circuit is maintained until the end of the coil oscillation period for the cylinder being evaluated.

A second measure operation 914 measures a second RPM of the engine during this disabled state. A compare operation 916 compares the first RPM of the engine to the second RPM of the engine to determine a relative contribution of that cylinder to the overall engine performance. A display operation 918 displays the results to the user, mechanic, or technician. A test module 920 determines if there are additional cylinders to be tested. If the test module 920 determines that there are additional cylinders to be tested, operational flow branches "YES" to the first measure operation 906, and operational flow continues as previously described for the next cylinder. If the test module 920 determines that there are not additional cylinders to be tested, operational flow branches "NO" to the terminal point 922.

Figure 10:
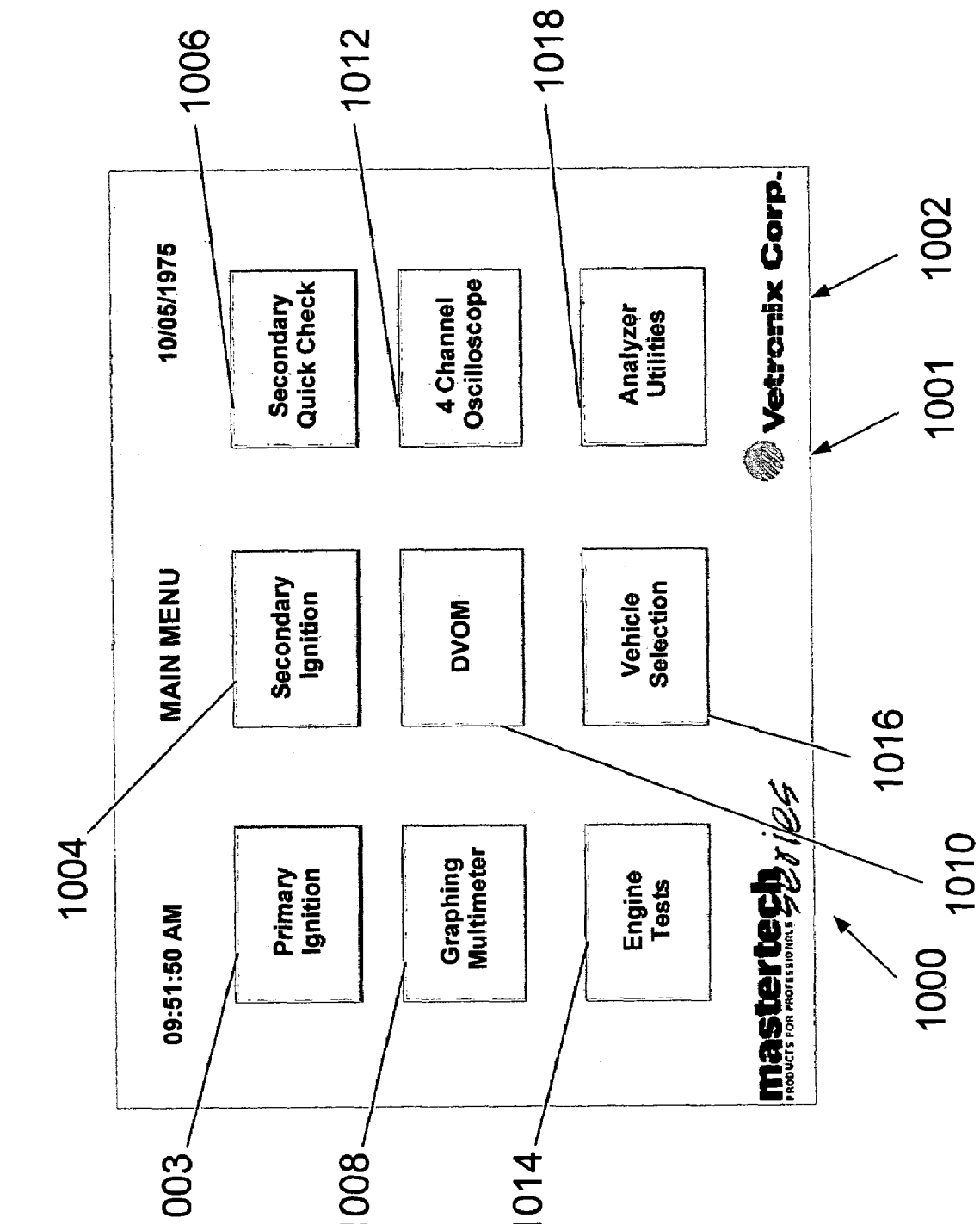
FIG. 10 illustrates an example graphic user interface of a diagnostic system, according to an exemplary embodiment of the present disclosure.

FIGS. 10–19 are illustrative screen-shots of a diagnostic system's 1000 user interface 1001, according to an example embodiment of the present disclosure. FIG. 10 illustrates a main menu 1002. A variety of possible functions are listed for the diagnostic system 1000. These functions include Primary Ignition 1003, Secondary Ignition 1004, Secondary Quick Check 1006, a Graphing Multimeter 1008, a DVOM 1010, a 4 Channel Oscilloscope 1012, Engine Tests 1014, Vehicle Selection 1016, and Analyzer Utilities 1018. Preferably, the user interface utilizes a touch-screen display, as is known in the art, so that the user can simply touch the key, or button, to which he wants to select. Of course, any suitable interface could be used. In this example, the user selects the Engine Tests key 1014 by touching the screen where it says "Engine Tests".

Figure 11:
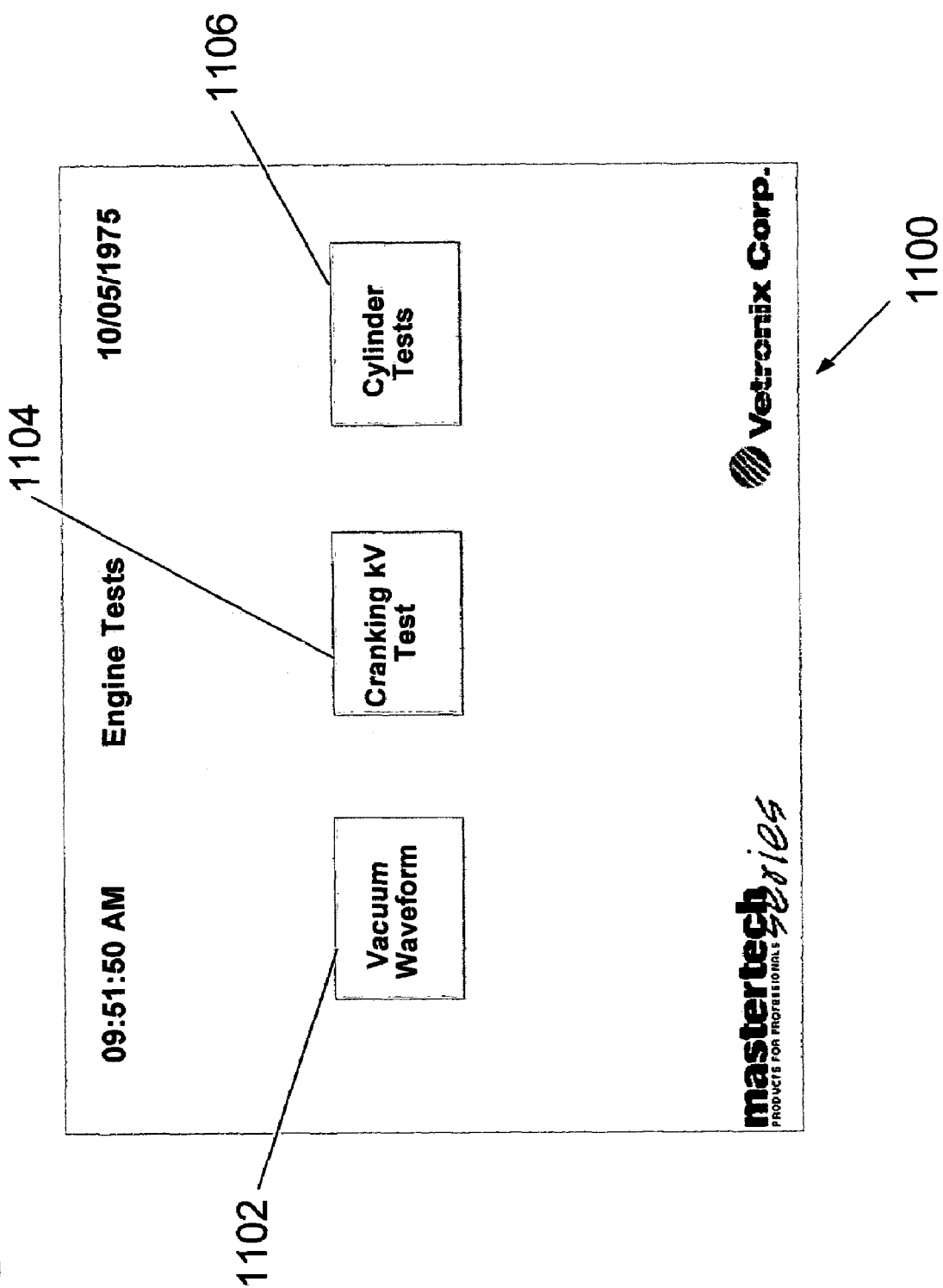
FIG. 11 illustrates an example graphic user interface of a diagnostic system, according to an exemplary embodiment of the present disclosure.

FIG. 11 illustrates the Engine Tests Screen 1100. Under the Engine Tests mode 1100 of the diagnostic system 1000, the user can select Vacuum Waveform 1102, Cranking kv Test 1104, or Cylinder Tests 1106. In this example, the user selects the Cylinder Tests 1106 key.

Figure 12:
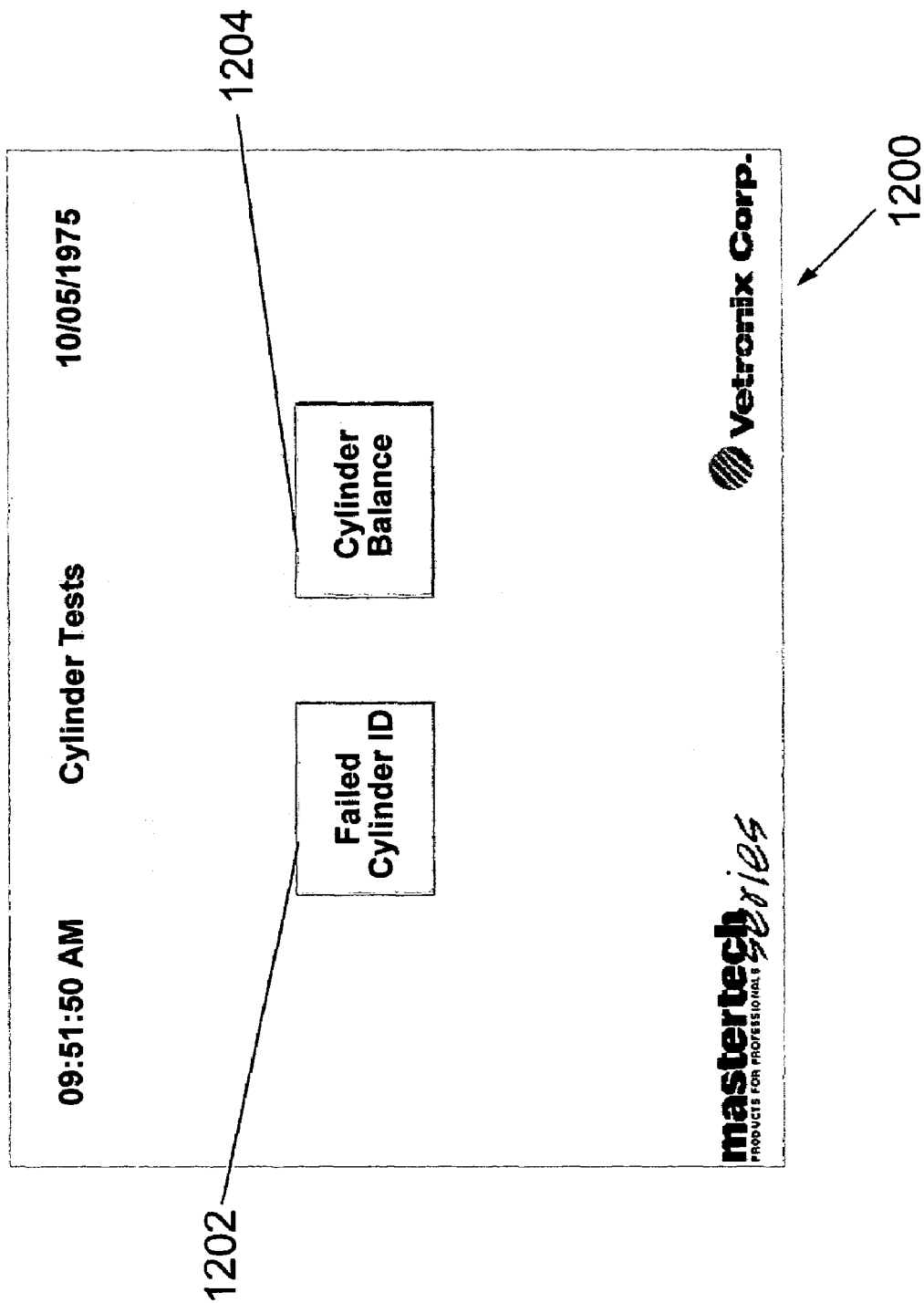
FIG. 12 illustrates an example graphic user interface of a diagnostic system, according to an exemplary embodiment of the present disclosure.

FIG. 12 illustrates the Cylinder Tests screen 1200. Under the Cylinder Tests mode 1200 of the diagnostic system 1000, the user can select Failed Cylinder ID 1202 or Cylinder Balance 1204. In this example, the user selects the Failed Cylinder ID key.

Figure 13:
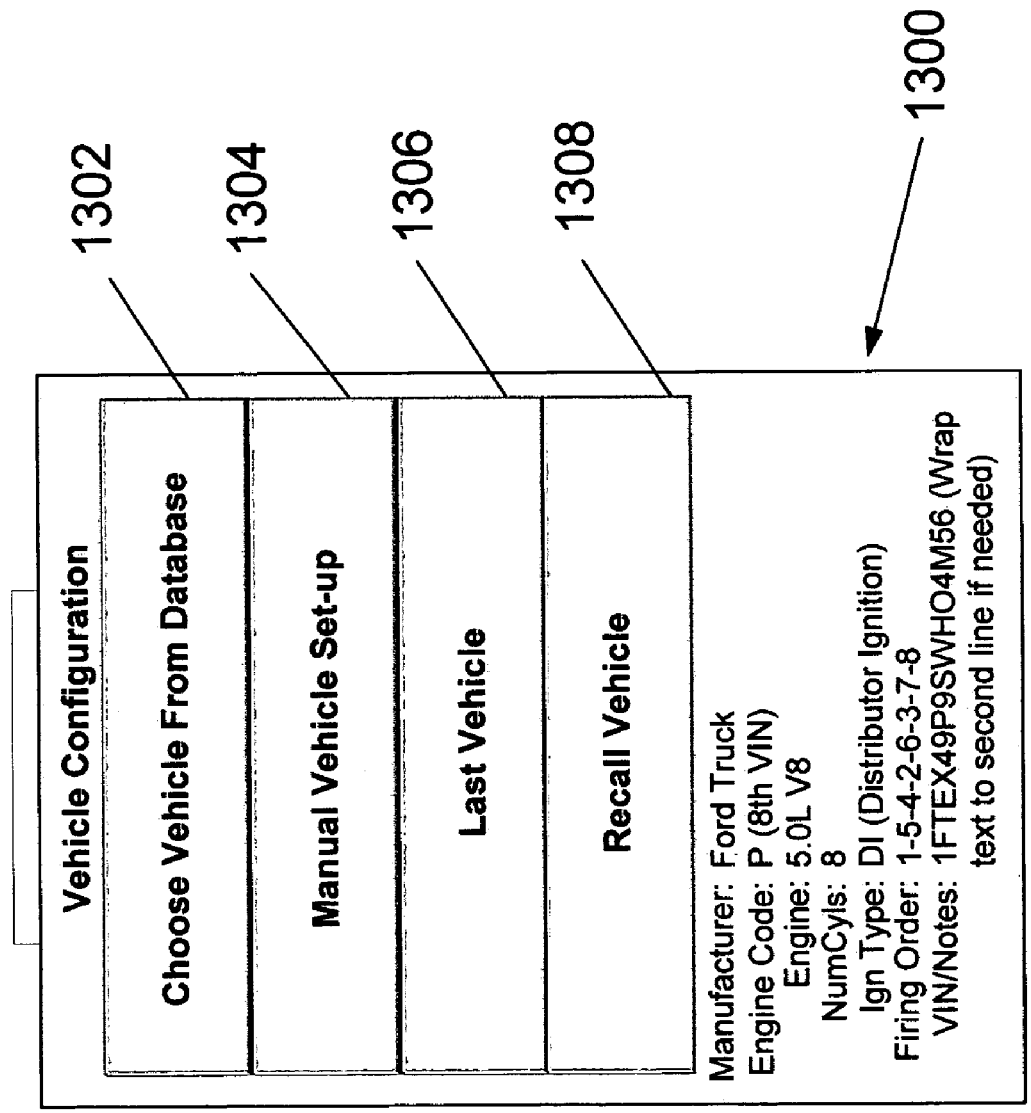
FIG. 13 illustrates an example graphic user interface of a diagnostic system, according to an exemplary embodiment of the present disclosure.

FIG. 13 illustrates a Vehicle Configuration Screen 1300. When the user selected the Failed Cylinder ID key 1202 on the Cylinder Tests screen 1200 FIG. 12 the Vehicle Configuration Screen 1300 appears. The diagnostic system 1000 needs to know which vehicle is being diagnosed, or more particularly which engine is being diagnosed, because each engine has unique attributes, for example, the number of cylinders, the dwell period of the cylinder, and the firing order of the cylinders. Under the Vehicle Configuration screen 1300, the user has the option of selecting Choose Vehicle from Database 1302, Manual Vehicle Set-up 1304, Last Vehicle 1306, or Recall Vehicle 1308.

The diagnostic system 1000 includes numerous vehicles in its database. The user of the diagnostic system 1000 can select the Choose Vehicle from Database 1302 key to select a vehicle from the database. Alternatively, the user can select the Manual Vehicle Set-up key 1304 to manually enter information about the vehicle's engine. Such information might include the manufacturer, the engine code, the engine type, the number of cylinders, the ignition type, the firing order, and the Vehicle Identification Number (VIN). In addition, the user could select the Last Vehicle key 1306. Doing so would use the information on the last vehicle tested by the diagnostic system 1000 to perform the current diagnosis. Furthermore, the user could select the Recall Vehicle key 1308. The diagnostic system 1000 can store information related to numerous vehicles that have been previously tested. Thus, if a vehicle has been in for testing before, that vehicle would be in the recall vehicle database and can be selected.

Figure 14:
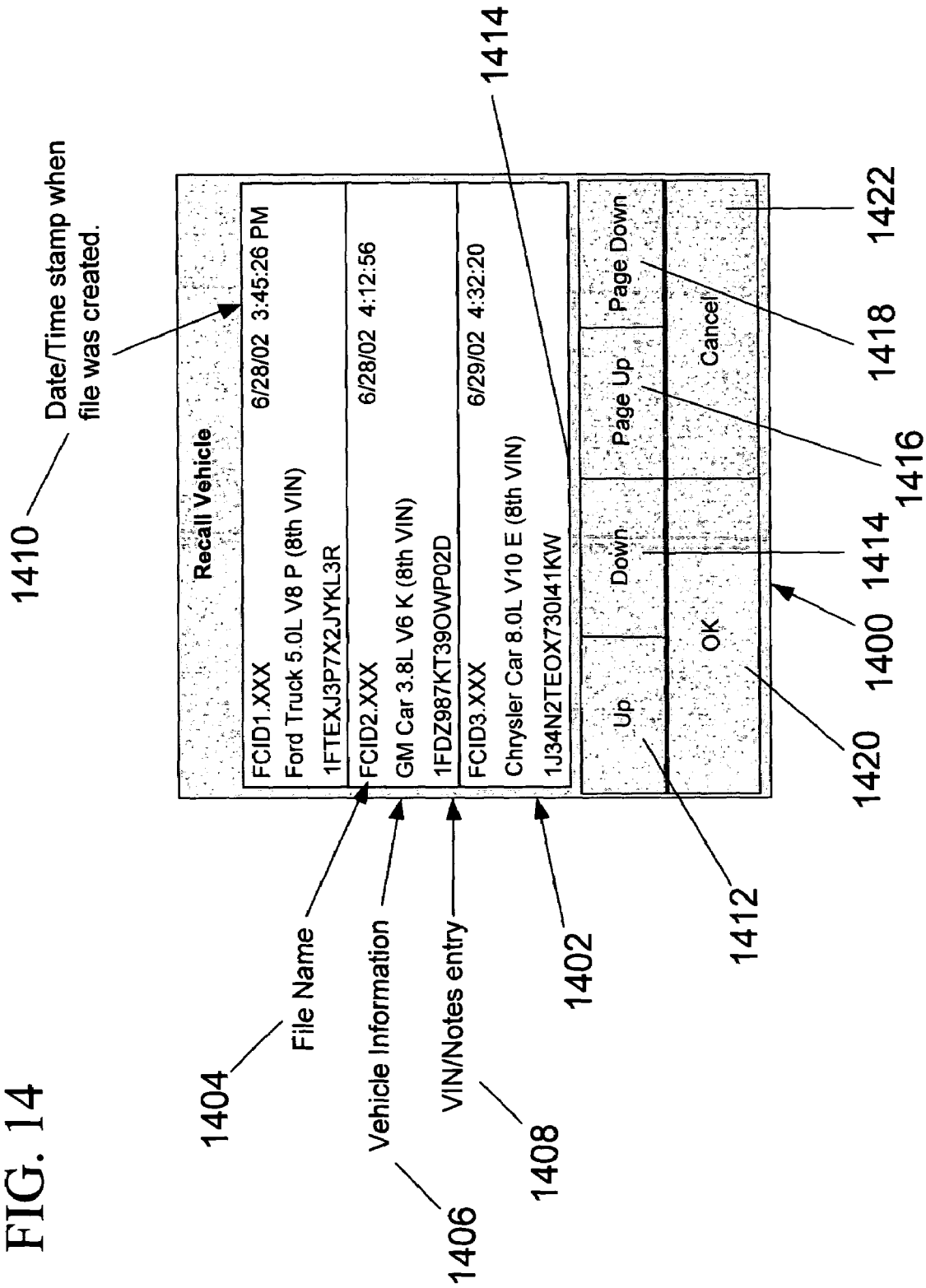
FIG. 14 illustrates an example graphic user interface of a diagnostic system, according to an exemplary embodiment of the present disclosure.

FIG. 14 illustrates the screen 1400 that would be displayed if the user selected the Recall Vehicle key 1308 of FIG. 13. The Recall Vehicle screen 1400 includes a scrollable list 1402 of previously stored vehicles. The list would include information such as the file name 1404, the vehicle information 1406, the VIN/notes entry 1408, and a date/time stamp 1410 of when the file was created. The user can scroll through the list 1402 by using the Up 1412 and Down 1414 keys illustrated. To scroll the list 1402 by page, the user can select the Page Up key 1416 or the Page Down key 1418. The user can select the vehicle by pressing on the vehicle in the list 1402 and then selecting the OK key 1420. The user can go back a screen by selecting the Cancel key 1422.

Figure 15:
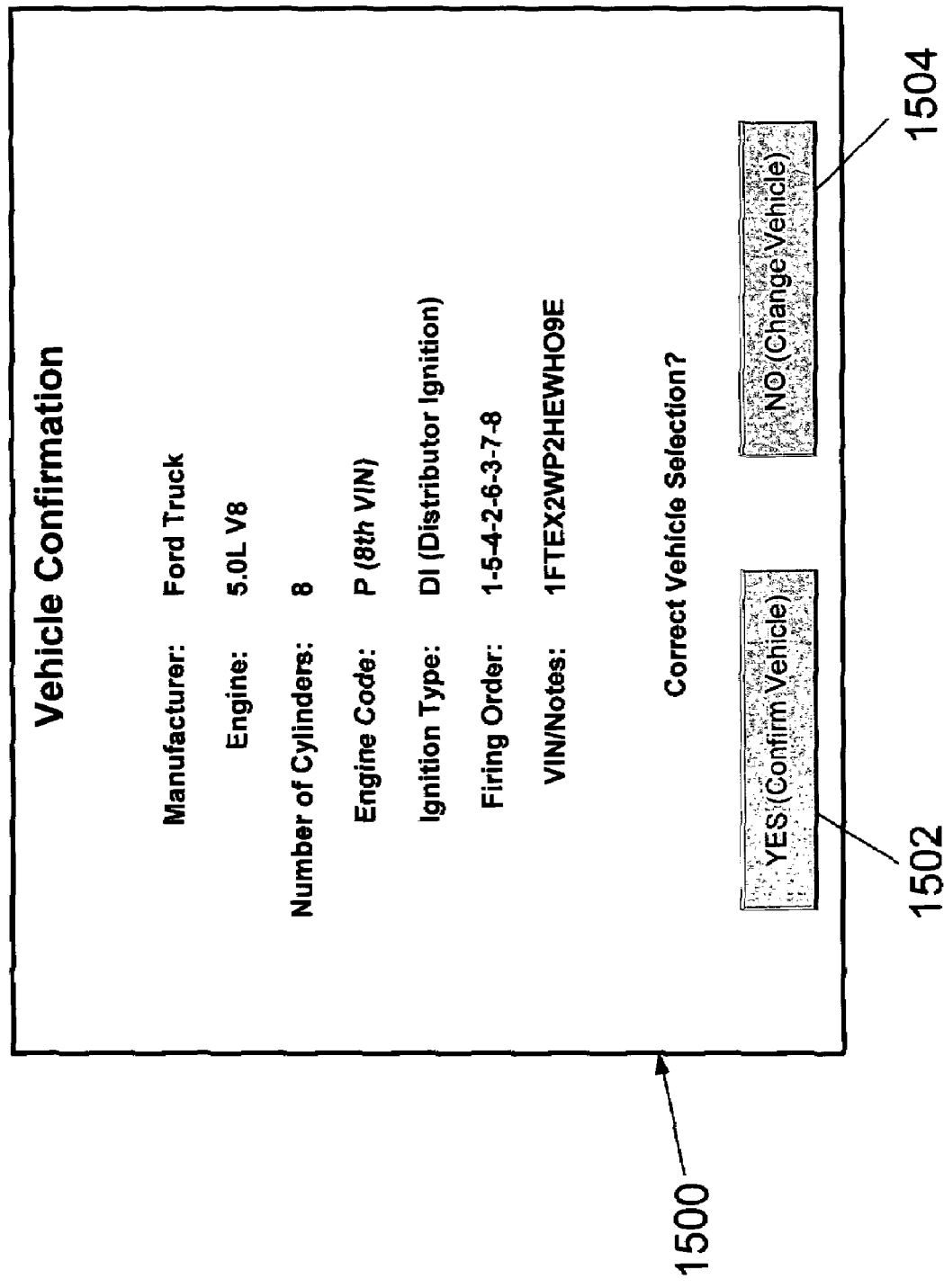
FIG. 15 illustrates an example graphic user interface of a diagnostic system, according to an exemplary embodiment of the present disclosure.

By selecting a vehicle and hitting the OK key 1420, a Vehicle Confirmation screen 1500 is displayed as illustrated in FIG. 15. Of course, entering a vehicle by one of the other methods illustrated in connection with FIG. 13 would also result in the display of the Vehicle Confirmation screen 1500. The user simply confirms that the vehicle displayed in the screen 1500 is the correct vehicle by hitting the YES key 1502. If the Vehicle is incorrect, the user can select the NO key 1504 and return to the Vehicle Configuration screen of FIG. 13.

Figure 16:
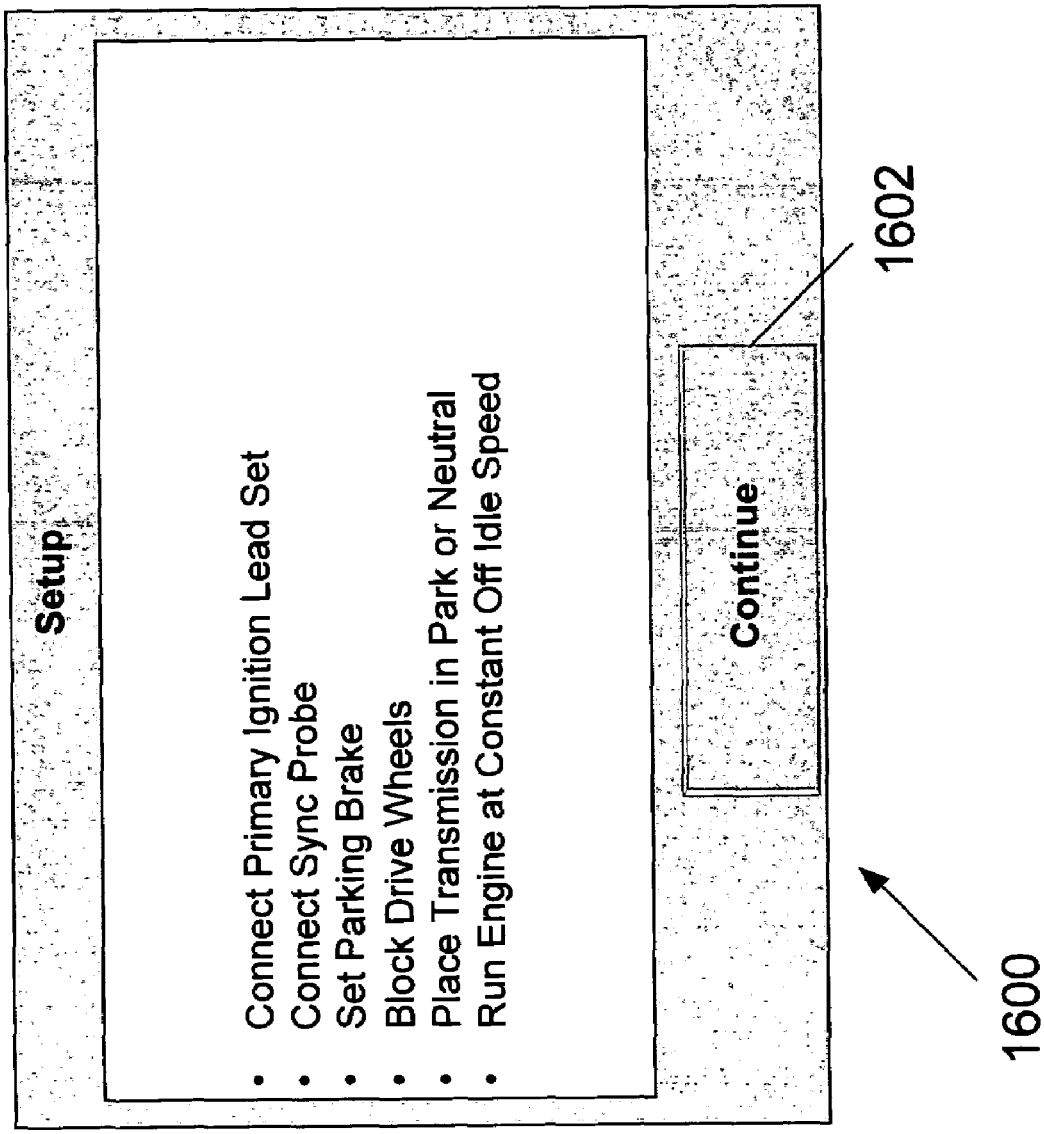
FIG. 16 illustrates an example graphic user interface of a diagnostic system, according to an exemplary embodiment of the present disclosure.

FIG. 16 illustrates instructions 1600 provided to the user of the diagnostic system 1000. These instructions 1600 can include, for example, connect primary ignition lead set, such as conductor 412 of FIG. 4, connect sync probe, such as the first probe 408 of FIG. 4, set parking brake, block drive wheels, place transmission in park or neutral, and run engine at constant off idle speed. The user can select the Continue key 1602 to proceed.

Figure 17:
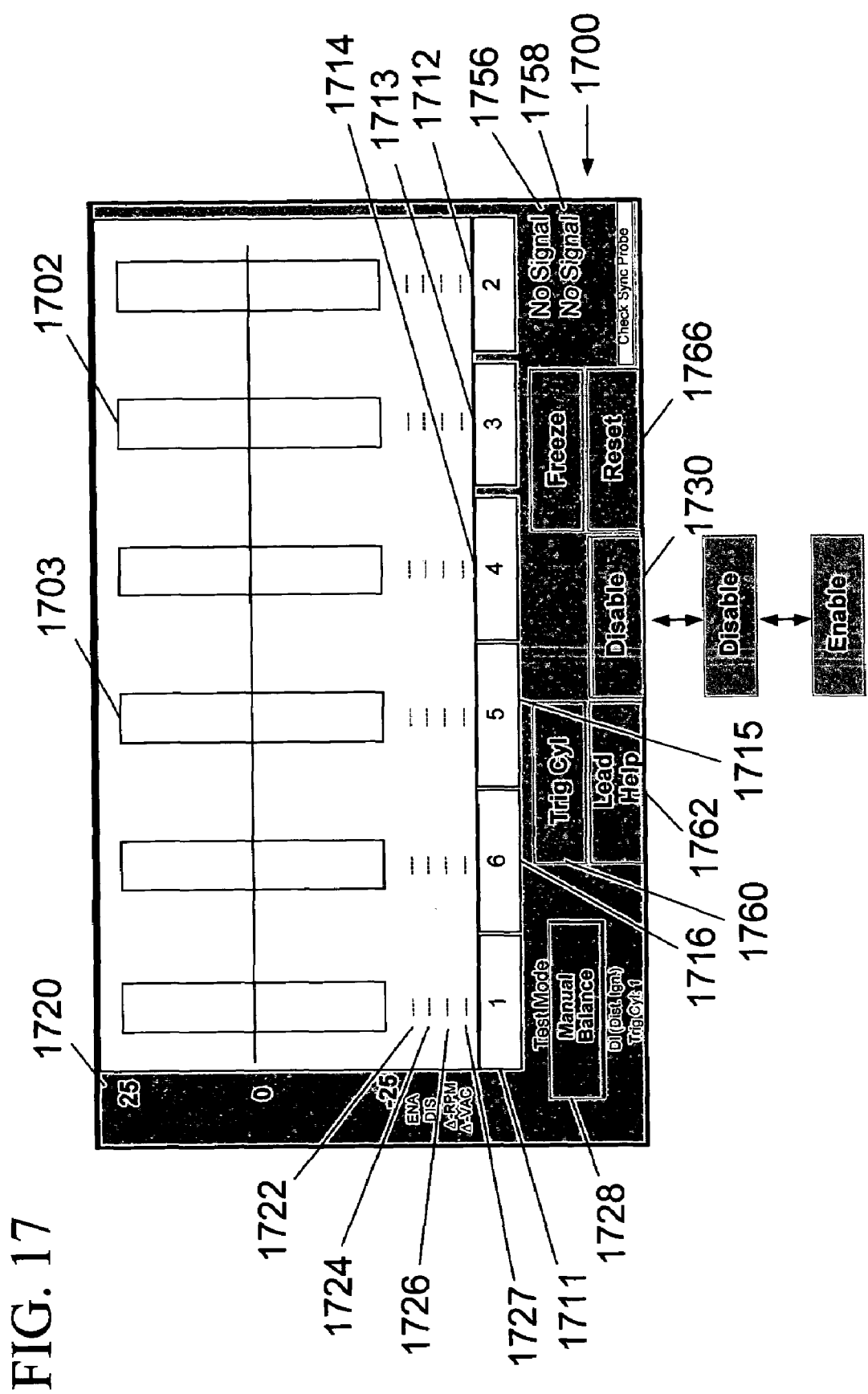
FIG. 17 illustrates an example graphic user interface of a diagnostic system, according to an exemplary embodiment of the present disclosure.

FIG. 17 illustrates the cylinder balance screen 1700. The cylinder balance screen 1700 includes a bar graph area 1702 depicting a bar 1703 for each of, in this example, six cylinders 1711–1716, such as cylinders 301–306 of FIG. 3. On the left side of the bar graph area 1702 is an RPM scale 1720. Preferably, this RPM scale 1720 can automatically scale upwards or downwards depending on engine RPM. The cylinder balance screen 1700 also includes an ENA field 1722 under each bar 1703. This field gives the enabled RPM of the engine without ignition interruption. The cylinder balance screen 1700 also includes a DIS field 1724 under each bar 1703. This field gives the disabled RPM of each cylinder 1711–1716. The cylinder balance screen 1700 also includes a change in RPM field 1726. This field 1726 is the difference between the ENA field 1722 and the DIS field 1724. The cylinder balance screen also includes a change in vacuum field 1727. This field 1727 is utilized when an optional third probe, such as the third probe 422 of FIG. 4, is used in the diagnostic system 1000. If the optional third probe is not used, this field 1727 is hidden.

The diagnostic system 1000 defaults to a manual balance mode as indicated in field 1728. The cylinder balance screen 1700 includes a disable/enable key 1730. The disable/enable key 1730 is grayed out or inactive until a enabled RPM has been measured. Once the enabled RPM has been measured, the disable/enable key 1730 becomes active and reads "DISABLE". The user selects a cylinder 1711–1716 to disable or test by pressing the cylinder number and then selects the DISABLE key 1730. The DISABLE key 1730 then changes to ENABLE. The user selects the ENABLE key to stop the interruption of the ignition and enable all cylinders to fire.

The cylinder balance screen displays the current live engine RPM in an RPM field 1756. If the optional third probe 422 is used, the current live DC vacuum is displayed in an DC vacuum field 1758.

The cylinder balance screen 1700 also includes a Trig Cyl (Trigger Cylinder) key 1760. The Trig Cyl key 1760 permits selection of the cylinder to trigger. The cylinder balance screen 1700 also includes a Lead Help key 1762. The Lead Help key 1762 brings up a bitmap identifying how to connect the diagnostic system 1000 to the engine, such as the engine 300 of FIG. 3. The cylinder balance screen 1700 also includes a Freeze key 1764. The Freeze key 1764 results in the diagnostic system 1000 stopping refreshing the data values and the Enable key 1730 shall disappear from the display. A "Frozen" message shall flash to indicate the diagnostic system 1000 is frozen. Even though the display is frozen, the engine RPM and vacuum (if applicable) information shall continue to be captured.

The cylinder balance screen 1700 also includes a Reset key 1766. Preferably, the Reset key 1766 causes all values 1722, 1724, 1726, 1727 to be dashed out, any shading is removed from the display, the cylinders 1711–1716 are unhighlighted, the auto scaling range for the bars 1703 is set back to its lowest setting, the disable key 1730 is grayed out, the live rpm values 1756 and the live vacuum values 1758 are momentarily reset, and the memory of the buffers is reset.

Figure 18:
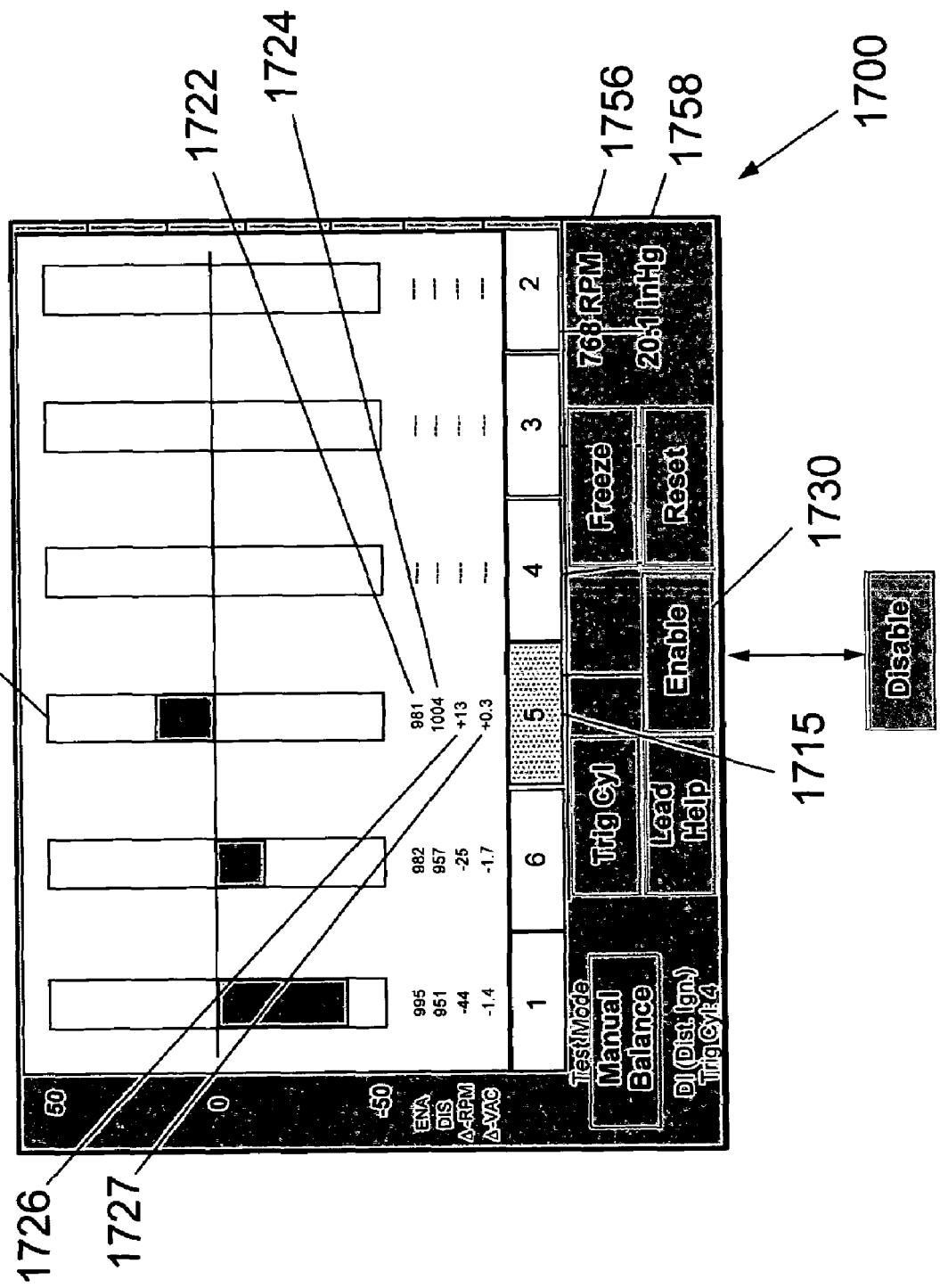
FIG. 18 illustrates an example graphic user interface of a diagnostic system, according to an exemplary embodiment of the present disclosure.

FIG. 18 illustrates the cylinder balance screen 1700 during testing. The fifth cylinder 1715 is highlighted indicating the user has selected this cylinder 1715 for testing. The Disable/Enable key 1730 now reads ENABLE because the diagnostic system 1000 is currently testing the fifth cylinder 1715. The user can stop the test by hitting the ENABLE key 1730. The ENA field 1722, DIS field 1724, change in RPM field 1726 and the vacuum field 1727 all have values in them and the bar 1703, corresponding to the fifth cylinder 1715, has a graphical representation of the running average RPM difference 1726 for a set number of data points.

Figure 19:
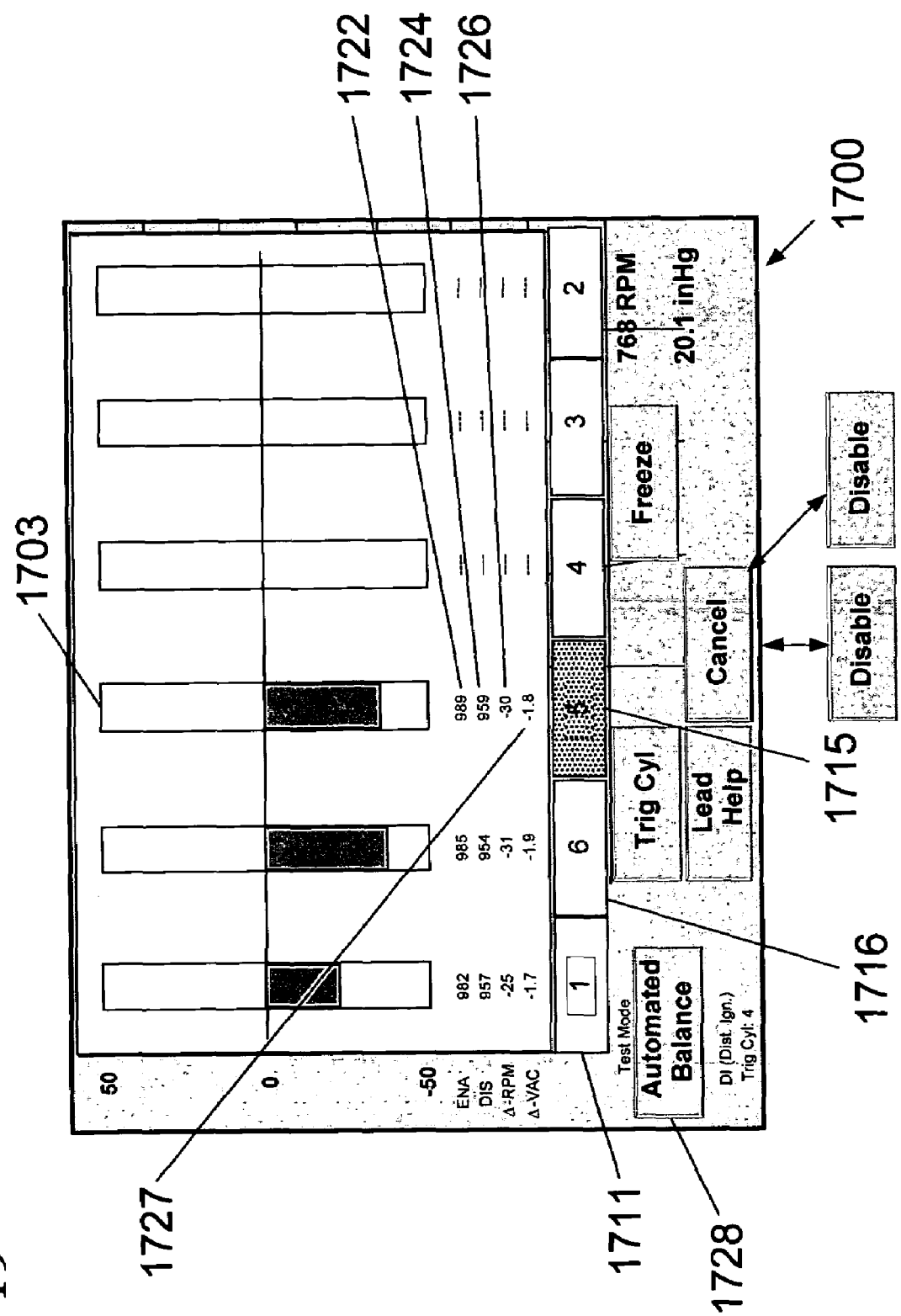
FIG. 19 illustrates an example graphic user interface of a diagnostic system, according to an exemplary embodiment of the present disclosure.

FIG. 19 illustrates the cylinder balance screen 1700 during automatic testing. Field 1728 now reads "Automated Balance" to indicate to the user that the diagnostic system 1000 is in automatic mode. During automated balance, the diagnostic system 1000 will disable the first cylinder, such as the first cylinder 301 of FIG. 3 in the firing order for a predetermined period of time. Upon completion of the first cylinder, the diagnostic system 1000 will allow for return to the enabled state and an engine RPM recovery. Then, the diagnostic system 1000 will disable the next cylinder in the firing order. This will continue until all cylinders have been tested.

It is noted that in FIG. 19, that cylinder five is the active cylinder 1715 being tested. Preferably, the bar 1703, corresponding to cylinder five 1715, represents continuous running average of the RPM difference 1726. The values 1722, 1724, 1726, and 1727 are also real time values. In the first cylinder 1711 and the sixth cylinder 1716, the values are frozen, displaying the results at the end of the testing of those cylinders.

Although not shown, the diagnostic system 1000 contains additional functionality. Some example of such functionality include prompting the user of a signal is lost, allowing the user to select the duration of disabling a cylinder, user selection for cylinder deactivation time, the units of measure, and the like. The results of the any of the tests can be saved for later recall or printed.

Figure 20:
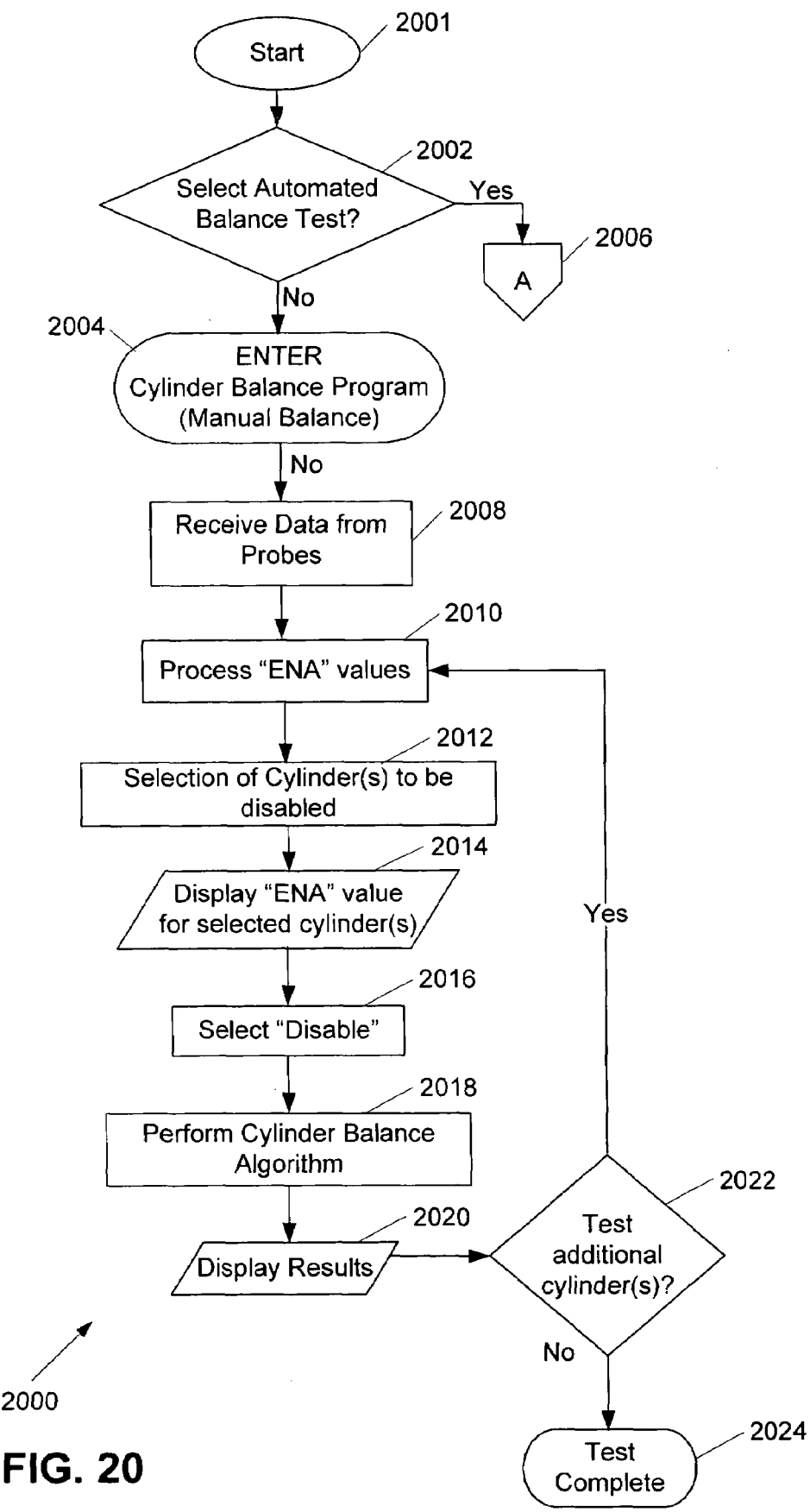
FIG. 20 illustrates a logical process flow diagram of a diagnostic system, according to an example embodiment of the present invention.

FIG. 20 illustrates an operational flow of a diagnostic system 2000, according to an example embodiment. Operational flow begins at a start point 2001. An automated module 2002 determines if this is an automated balance test. If the automated module 2002 determines that this an automated balance test, operational flow branches "YES" to link A 2006, and operational flow continues according to FIG. 21. If the automated module 2002 determines that this is not an automated test, Operational flow branches "NO" to an enter operation 2004. The enter operation 2004 begins the manual balance function of the diagnostic system 2000. A data operation 2008 receives, or acquires, data from a first probe and a second probe, such as the first probe 408 and second probe 410 of FIG. 4, and the optional third probe, such as the third probe 422 of FIG. 4.

A process operation 2010 process the engine RPM associated with an enabled state. A selection operation 2012 selects which cylinder is to be disabled. A first display operation 2014 displays the ENA values. A select operation 2016 selects the disable function to disable the selected cylinder by the selection operation 2012. A perform operation 2018 performs the cylinder balance algorithm for the cylinder selected by the selection operation 2012 and disabled by the select operation 2016. A second display operation 2020 displays the results, for example, the display illustrated in FIG. 18.

A test module 2022 determines whether to test additional cylinders. If the test module 2022 determines that an additional cylinder should be tested, operational flow branches "YES" to the process operation 2010, and operational flow continues as previously described. If the test module 2022 determines that there are not any additional cylinders to test, operational flow branches "NO" to the test complete operation 2024, and operational flow terminates.

Figure 21:
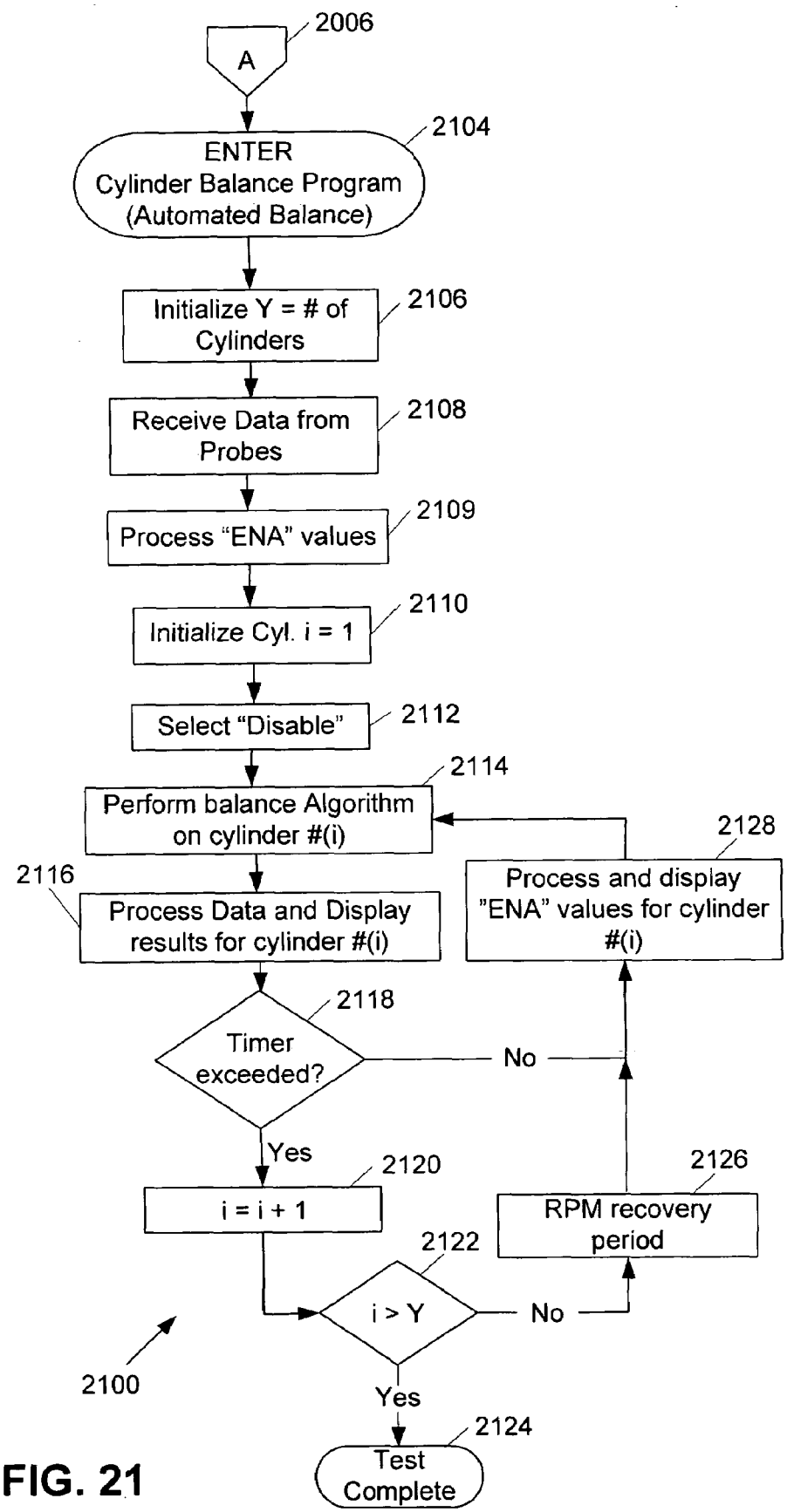
FIG. 21 illustrates a continuation of the logical process flow diagram of FIG. 20, according to an example embodiment of the present invention.

Referring back to the automated module 2002, if the automated module 2002 that this an automated balance test, operational flow branches "YES" to link A, and operational flow continues according to FIG. 21. An enter operation 2104 begins the automated balance function of the diagnostic system 2000. An initialize operation 2106 initializes a number of cylinders to be tested. A receive operation 2108 receives, or acquires, data from a first probe and a second probe, such as the first probe 408 and second probe 410 of FIG. 4, and the optional third probe, such as the third probe 422 of FIG. 4.

An ENA operation 2109 process the engine RPM associated with an enabled state. An initialize operation 2110 initializes a value Y equal to the number of cylinders in the engine. A select operation 2112 selects the Disable function to disable the first cylinder. A perform operation 2114 performs the balance algorithm on the first cylinder and displays the results to the user. A timer module 2118 determines if a timer has been exceeded. If the timer module 2118 determines that the timer module 2118 has been exceeded, operational flow branches "YES" to a counter operation 2120. The counter operation 2120 sets a value i equal to i+1. So, after the first cylinder, the counter value i is equal to 2 (or the second cylinder to be tested).

An end module 2122 determines if the value of i is greater than the value of Y. If the value of i is greater than the value of Y, then all cylinders have been tested. If the value is i is not greater than the value of Y, then more cylinders need be tested. If the end module 2122 determines that the value of i is greater than the value of Y, then operational flow branches "YES" to a test complete terminal point 2124. If the end module 2122 determines that the value of i is not greater than the value of Y, then operational flow branches "NO" to a recovery operation 2126.

The recovery operation 2126 allows the engine RPM to return to normal prior to further testing. A process operation 2128 processes the enabled RPM and displays it for the next cylinder. Operational flow proceeds to the perform operation 2114, and operational flow continues as previously described.

The above discussion can best be understood in terms of application examples. In a first application example, referring to FIGS. 3 and 4, an automobile owner brings their automobile to a technician complaining of loss of power and a rough running engine 300. The technician connects the diagnostic system 400 to the engine as described in connection with FIG. 4.

Referring to FIGS. 10–19, the technician pushes the Engine Tests key 1014, the Cylinder Tests key 1106, the Cylinder Balance key 1204, and the Recall Vehicle key 1308. This owner has been in for similar problems in the past, so the vehicle information has been previously stored in the diagnostic system 400. If this had been a new owner, the technician could have pushed the Choose Vehicle from Database key 1302 or the Manual Vehicle Set-up key 1304. The technician selects the vehicle from the stored list 1402, pushes the OK key 1420, and confirms the vehicle with the YES key 1502. Because the technician already connected the diagnostic system 400 in accordance with FIG. 4 and has already complied with the remaining instructions, the technician pushes the Continue key 1602.

Referring to FIGS. 18 and 20, operational flow begins at start 2001. The diagnostic system 2000 enters the manual balance program 2004 and the automated module 2002 determines that this is manual test and operational flow branches "NO" to the data operation 2008. The diagnostic system 2000 receives signals from the first probe 408 and the second probe 410. The process operation 2010 measures the RPM of the engine in the enabled state. As shown in FIG. 18, the technician has selected the fifth cylinder, such as the fifth cylinder 305 of FIG. 3, for testing. The display operation 2014 displays the ENA value for the fifth cylinder in field 1722. This value corresponds to "981" in this example. The technician pushes the DISABLE key 1730. The perform operation 2018 performs the cylinder balance algorithm.

Referring to FIG. 4, the diagnostic system 400 applies a direct current voltage to the negative terminal 340 of the ignition coil 330. This voltage prevents the first coil 334 from charging and thus limits the voltage developed on the second coil 336 to less than twelve volts. Thus, when the distribute sends the voltage from the second coil 336 down the wire 325 to the fifth spark plug 315, the voltage applied to the fifth spark plug 315 is insufficient to cause electricity to arc the air gap in the fifth spark plug, and the fuel/air mixture is not ignited. Thus, the fifth cylinder 305 is rendered inoperative. The direct current voltage is applied to the negative terminal 340 of the ignition coil 330 for the entire dwell period of the fifth cylinder.

Referring back to FIG. 18, the display operation 2020 displays the results of the cylinder test as illustrated in FIG. 18. The DIS field 1724 displays a "1004" and the change in RPM field 1726 displays a positive "13". The test additional cylinder's operation 2022 determines that there are no additional cylinders to test and operational flow branches "NO" to the test complete 2024 and operational flow terminates.

Figure 22:
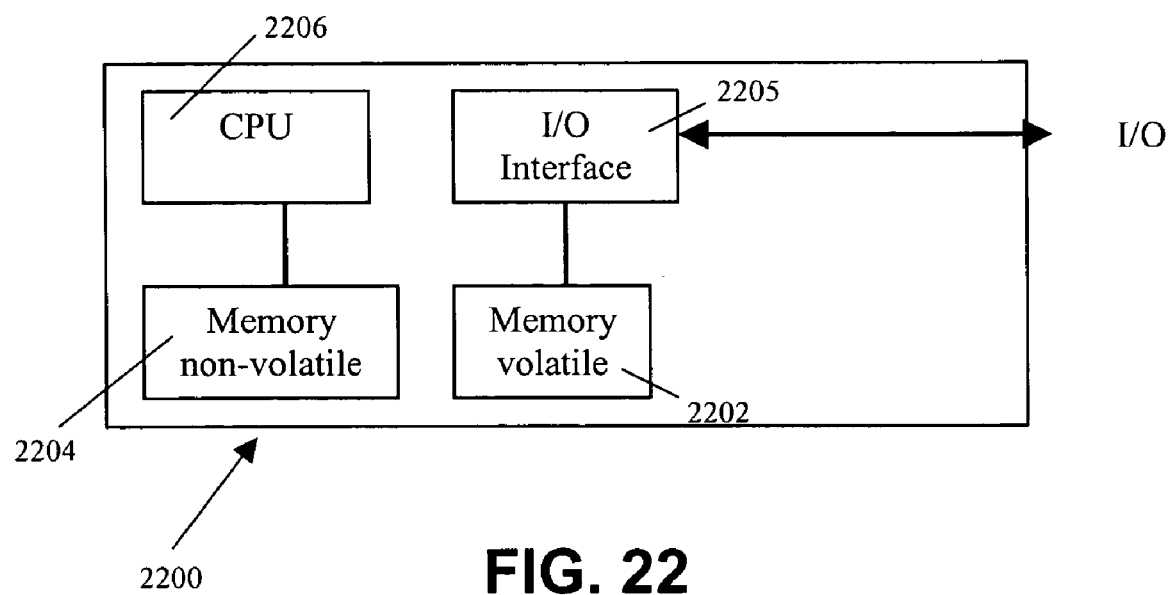
FIG. 22 is a block diagram of a diagnostic system, according to an example embodiment of the present invention.

A hardware model could be used to implement a diagnostic system based on the methodology described above. FIG. 22 illustrates the minimum hardware that is required to implement a diagnostic system 2200. The diagnostic system typically includes a volatile memory 2202, such as a RAM, a non-volatile memory 2204, such as an EPROM, FLASH, or a hard drive, a CPU 2206, and an Input/Output (I/O) Interface 2208. The non-volatile memory 2204 could be any type and is used to store the control program and data associated with user controls and test data described above. The volatile memory 2202 could be any type and is used to store user variables, calculations, and storing an image of the I/O data. The I/O Interface 2208 converts data from a system bus to an I/O bus, which could be serial or parallel and could use any type of encoding scheme, or none at all.

One skilled in the art would recognize that the system described herein can be implemented using any number of configurations.

The logical operations of the various embodiments illustrated herein can be implemented (1) as a sequence of computer implemented steps or program modules running on a computing system and/or (2) as interconnected logic circuits or circuit modules within the computing system. The implementation is a matter of choice dependent on the performance requirements of the computing system implementing the invention. Accordingly, the logical operations making up the embodiments of the present invention described herein are referred to variously as operations, steps, engines, or modules.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A method of evaluating a contribution of a cylinder to an engine, the method comprising:
   measuring a first revolutions per minute of the engine during an enabled state;
   determining a dwell period of the cylinder;
   applying a direct current voltage signal into a negative terminal of an ignition coil of the engine during the dwell period to disable the cylinder and create a disabled state; and
   measuring a second revolutions per minute of the engine during the disabled state.

2. A method according to claim 1 further comprising:
   comparing the first revolutions per minute of the engine during the enabled state to the second revolutions per minute during the disabled state to determine the contribution of the cylinder to the engine.

3. A method according to claim 1 further comprising:
   receiving data from first and second probes.

4. A method according to claim 3 wherein:
   receiving data from first and second probes includes receiving data from a sync probe and a primary probe.

5. A method according to claim 3 further comprising:
   receiving data from a third probe.

6. A method according to claim 5 wherein:
   receiving data from a third probe includes receiving data from a vacuum probe.

7. A method according to claim 1 further comprising:
   allowing a recovery period for the revolutions per minute of the engine to return to a measured value measured during the enabled state.

8. A system for evaluating a contribution of a cylinder to an engine, the system comprising:
- a first measure module that measures a first revolutions per minute of the engine during an enabled state;
- a determine module that determines a dwell period of the cylinder;
- an apply module that applies a direct current voltage signal into a negative terminal of an ignition coil of the engine during the dwell period to disable the cylinder and create a disabled state; and
- a second measure module that measures a second revolutions per minute of the engine during the disabled state.

9. A system according to claim 8, further comprising:
a compare module that compares the first revolutions per minute of the engine during the enabled state to the second revolutions per minute during the disabled state to determine the contribution of the cylinder to the engine.

10. A method according to claim 8, further comprising:
a receive module that receives data from first and second probes.

11. A method according to claim 10 wherein:
the first probe is a sync probe and the second probe is a primary probe.

12. A method according to claim 10 wherein:
the receive module receives data from a third probe.

13. A method according to claim 12 wherein:
the third probe is a vacuum probe.

14. A method according to claim 8, further comprising:
an allow module that allows a recovery period for the revolutions per minute of the engine to return to a measured value measured during the enabled state.

15. A computer program product readable by a computing system and encoding instructions for evaluating a contribution of a cylinder to an engine, the computer process comprising:
- measuring a first revolutions per minute of the engine during an enabled state;
- determining a dwell period of the cylinder;
- applying a direct current voltage signal into a negative terminal of an ignition coil of the engine during the dwell period to disable the cylinder and create a disabled state; and
- measuring a second revolutions per minute of the engine during the disabled state.

16. A computer program product according to claim 15, further comprising:
comparing the first revolutions per minute of the engine during the enabled state to the second revolutions per minute during the disabled state to determine the contribution of the cylinder to the engine.

17. A computer program product according to claim 15, further comprising:
receiving data from first and second probes.

18. A computer program product according to claim 17 wherein:
receiving data from first and second probes includes receiving data from a sync probe and a primary probe.

19. A computer program product according to claim 17 further comprising:
receiving data from a third probe.

20. A computer program product according to claim 19 wherein:
receiving data from a third probe includes receiving data from a vacuum probe.

21. A system for diagnosing an internal combustion engine, the system comprising:
- a computing system that executes an algorithm for evaluating a contribution of a cylinder in the internal combustion engine;
- a clamping circuit that applies a direct current voltage to a negative terminal of an ignition coil in the internal combustion engine; and
- a plurality of devices that connects the computing system and the clamping circuit to the internal combustion engine.

22. A graphical user interface used in conjunction with a diagnostic system for diagnosing an internal combustion engine having a plurality of cylinders, the graphical user interface comprising:
- a first field displaying the internal combustion engine's revolutions per minute with all cylinders firing;
- a second field displaying the internal combustion engine's revolutions per minute with a cylinder disabled;
- a third field displaying the difference between the first field and the second field;
- a graphical representation of the plurality of cylinders, including the cylinder number and a bar graph representing the third field; and
- a fourth field displaying the internal combustion engine's revolutions per minute at any one time.

* * * * *